(12) United States Patent
Diehl et al.

(10) Patent No.: US 9,977,760 B1
(45) Date of Patent: *May 22, 2018

(54) ACCESSING DATA ON DISTRIBUTED STORAGE SYSTEMS

(71) Applicant: Google Inc., Mountain View, CA (US)

(72) Inventors: Scott Fredrick Diehl, Madison, WI (US); Kyle Nesbit, Madison, WI (US)

(73) Assignee: Google LLC, Mountain View, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 14/138,240

(22) Filed: Dec. 23, 2013

(51) Int. Cl.
*G06F 15/173* (2006.01)
*G06F 17/30* (2006.01)

(52) U.S. Cl.
CPC .. *G06F 15/17331* (2013.01); *G06F 17/30194* (2013.01)

(58) Field of Classification Search
CPC ......... G06F 15/17331; G06F 17/30194; H04L 67/1097; H04L 67/2842; H04L 67/42
See application file for complete search history.

(56) References Cited

U.S. PATENT DOCUMENTS

| | | | |
|---|---|---|---|
| 7,043,610 B2 | 5/2006 | Horn et al. | |
| 7,082,456 B2 | 7/2006 | Mani-Meitav et al. | |
| 7,590,747 B2 | 9/2009 | Coates et al. | |
| 8,090,790 B2 * | 1/2012 | Bestler | H04L 49/90 709/206 |
| 8,190,816 B2 | 5/2012 | Balasubramanian et al. | |
| 9,058,122 B1 * | 6/2015 | Nesbit | G06F 3/0659 |
| 9,164,702 B1 * | 10/2015 | Nesbit | G06F 3/067 |
| 2004/0225719 A1 * | 11/2004 | Kisley | G06F 3/061 709/212 |
| 2012/0311271 A1 | 12/2012 | Klein et al. | |
| 2013/0185530 A1 | 7/2013 | Puttaswamy Naga et al. | |
| 2014/0047181 A1 * | 2/2014 | Peterson | G06F 12/0873 711/118 |
| 2014/0047193 A1 * | 2/2014 | Gross | G06F 12/0893 711/144 |

FOREIGN PATENT DOCUMENTS

EP 1622048 A1 2/2006

* cited by examiner

*Primary Examiner* — Gregory Todd
(74) *Attorney, Agent, or Firm* — Honigman Miller Schwartz and Cohn LLP

(57) ABSTRACT

A distributed storage system includes memory hosts, a curator, and a cache manager. Each memory host includes remote direct memory accessible non-transitory memory and a network interface controller that is in communication with the memory. The network interface controller services remote direct memory access requests. The curator communicates with the memory hosts, manages striping of a file amongst the memory hosts, and generates a file descriptor for the file that maps the striping of the file to corresponding storage locations on memory hosts. In addition, the cache manager stores copies of file descriptors generated by the curator in the memory of the memory hosts for remote direct memory access by a client in communication with the memory hosts.

20 Claims, 12 Drawing Sheets

ACCESSING DATA ON DISTRIBUTED STORAGE SYSTEMS

TECHNICAL FIELD

This disclosure relates to accessing data on distributed storage systems.

BACKGROUND

A distributed system generally includes many loosely coupled computers, each of which typically includes a computing resource (e.g., one or more processors) and/or storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers. Remote procedure calls (RPC) may transfer data from server processes to client processes. Alternatively, Remote Direct Memory Access (RDMA) primitives may be used to transfer data from server hardware to client processes.

Typical logic implementing a distributed cache system can be divided between client and server jobs. Server jobs placed on machines across a cluster respond to RPCs from clients instructing the server jobs to store or retrieve cache data on the corresponding machines on which the jobs reside. The server jobs may require access not only to low latency storage capacity but also to computation time of a central processing unit (CPU). The CPU time is required to process RPCs, compute cache placement policies (mappings from cache blocks to local storage addresses), manage cache eviction policies (in order to manage limited cache storage space), and provide concurrency control amongst many concurrent requests (server jobs are often multi-threaded in order to provide low latency and high throughput). This coupling of storage and computation requirements for cache server jobs can cause low utilization and/or high latency in general-purpose computing clusters (where server jobs are co-located with other jobs on the cluster's nodes), which is counter to the very purpose of the distributed cache.

SUMMARY

One aspect of the disclosure provides a distributed storage system that includes memory hosts, a curator, and a cache manager. Each memory host includes remote direct memory accessible non-transitory memory and a network interface controller that is in communication with the memory. The network interface controller services remote direct memory access requests. The curator communicates with the memory hosts, manages striping of a file amongst the memory hosts, and generates a file descriptor for the file that maps the striping of the file to corresponding storage locations on memory hosts. In addition, the cache manager stores copies of file descriptors generated by the curator in the memory of the memory hosts for remote direct memory access by a client in communication with the memory hosts.

Implementations of the disclosure may include one or more of the following features. In some implementations, the curator divides the file into stripes. For each stripe, the curator replicates the stripe or divides the stripe into data chunks. The file descriptor maps any stripe replicas and any data chunks to corresponding storage locations on memory hosts. In some examples, the curator includes non-transitory memory that stores the file descriptors.

In response to a memory access request for a file by the client, the curator may provide the client with a file descriptor associated with the file for remote direct memory access of the file on the memory hosts when the file descriptor is unretrievable from the memory hosts by the client. Additionally or alternatively, when the file descriptor is unretrievable from the memory hosts by the client, the curator informs the cache manager of the unretrievable file descriptor and the cache manager stores a copy of that file descriptor in the remote direct memory accessible non-transitory memory of the memory hosts. The curator may receive the memory access request from the client through a remote procedure call.

In some examples, the cache manager stores the file descriptors generated by the curator in a file descriptor cache having an address space on the memory hosts known by the client. The cache manager may store the file descriptor in the file descriptor cache in a circular data file having a fixed size, a first-in-first-out queue having a front and a back, and a tail pointer providing an offset to the front of the queue.

In some implementations, the file descriptor includes a key allowing access to the memory hosts. The file descriptor may include address information for the entire file, a stripe of the file, or a block of stripes within the file.

Another aspect of the disclosure provides a method of managing data in a distributed storage system. The method includes receiving a remote direct memory access request from a client for a file descriptor of a file stored on memory hosts of the distributed storage system. The file descriptor maps striping of the file to corresponding storage locations on the memory hosts. When the file descriptor is available on the memory hosts, the method includes returning the file descriptor to the client through remote direct memory access. When the file descriptor is unavailable on the memory hosts, the method includes returning the file descriptor to the client from non-transitory memory of a curator managing the striping of the file across the memory hosts. The curator may return the file descriptor via a remote procedure call.

When the file descriptor is unavailable on the memory hosts, the method may include storing a copy of the file descriptor in remote direct memory accessible non-transitory memory of the memory hosts. The method may further include storing the copy of the file descriptor in a file descriptor cache having an address space on the memory hosts known by the client. The file descriptor may be stored in a circular data file having a fixed size, a first-in-first-out queue having a front and a back, and a tail pointer providing an offset to the front of the queue. In some examples, the method includes servicing the remote direct memory access request through a network interface controller in communication with non-transitory memory of a memory host.

In some implementations, the method further includes receiving the file, dividing the file into stripes, replicating the stripe or dividing the stripe into data chunks, and generating the file descriptor for the file. The file descriptor maps any stripe replicas and any data chunks to corresponding storage locations on memory hosts. The method may include storing the file descriptor in non-transitory memory of the curator and storing a copy of the file descriptor in remote direct memory accessible non-transitory memory of the memory hosts.

In response to receiving a memory access request for a file having a file descriptor unavailable on the memory hosts, the method may include returning a file descriptor associated with the file for remote direct memory access of the file on the memory hosts. The method may include receiving the memory access request as a remote procedure call. The file descriptor may include a key allowing access to the memory hosts. The file descriptor may also include address information for the entire file, a stripe of the file, or a block of stripes within the file.

Yet another aspect of the disclosure provides a method of managing data in a distributed storage system. The method includes receiving a first request for a file descriptor of a file from a client. The file descriptor maps striping of the file to corresponding storage locations on memory hosts of the distributed storage system. When a copy of the file descriptor resides in remote direct memory accessible non-transitory memory of the memory hosts, the method includes returning the file descriptor to the client through remote direct memory access using a network interface controller in communication with non-transitory memory of the memory hosts. When a copy of the file descriptor is unretrievable from the memory hosts, the method includes returning the file descriptor to the client through a remote procedure call and storing a copy of the file descriptor in the remote direct memory accessible non-transitory memory of the memory hosts.

When a copy of the file descriptor is unretrievable from the memory hosts, the method may include retrieving the file descriptor from non-transitory memory of a curator managing the striping of the file across the memory hosts, before returning the file descriptor to the client. Additionally or alternatively, the method may include storing the copy of the file descriptor in a file descriptor cache having an address space in the remote direct memory accessible non-transitory memory of the memory hosts known by the client.

In some implementations, the method includes receiving the file, dividing the file into stripes, replicating the stripe or dividing the stripe into data chunks and generating the file descriptor for the file. The file descriptor maps any stripe replicas and any data chunks to corresponding storage locations on memory hosts. The method also includes storing the file descriptor in non-transitory memory of the curator and storing a copy of the file descriptor in the file descriptor cache. The file descriptor may include a key allowing access to the memory hosts and address information for the entire file, a stripe of the file, or a block of stripes within the file.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A distributed storage system may implement layers of redundancy by replicating and storing data (e.g., files) in loosely coupled memory. The system may use descriptors of the files (e.g., file descriptors or metadata) to allow clients of the system to locate and access the stored data. Accessing the data through remote procedure calls employs computational resources from a process on a remote host, which can lead to inefficiencies. When multiple clients share files, those clients may request the same file descriptor at the same time, which may increase a processor load significantly and potentially hurt the performance of the distributed storage system. Accessing file data through a remote direct memory access (RDMA) operation, versus a remote procedure call (RPC), frees up computational resources from a process on a remote host, because the operation is executed through hardware (e.g., a network interface controller) versus through a processor. Moreover, accessing the file descriptor for the file data through an RDMA operation is more efficient than an RPC, for at least the same reasons.

Figure 1A:
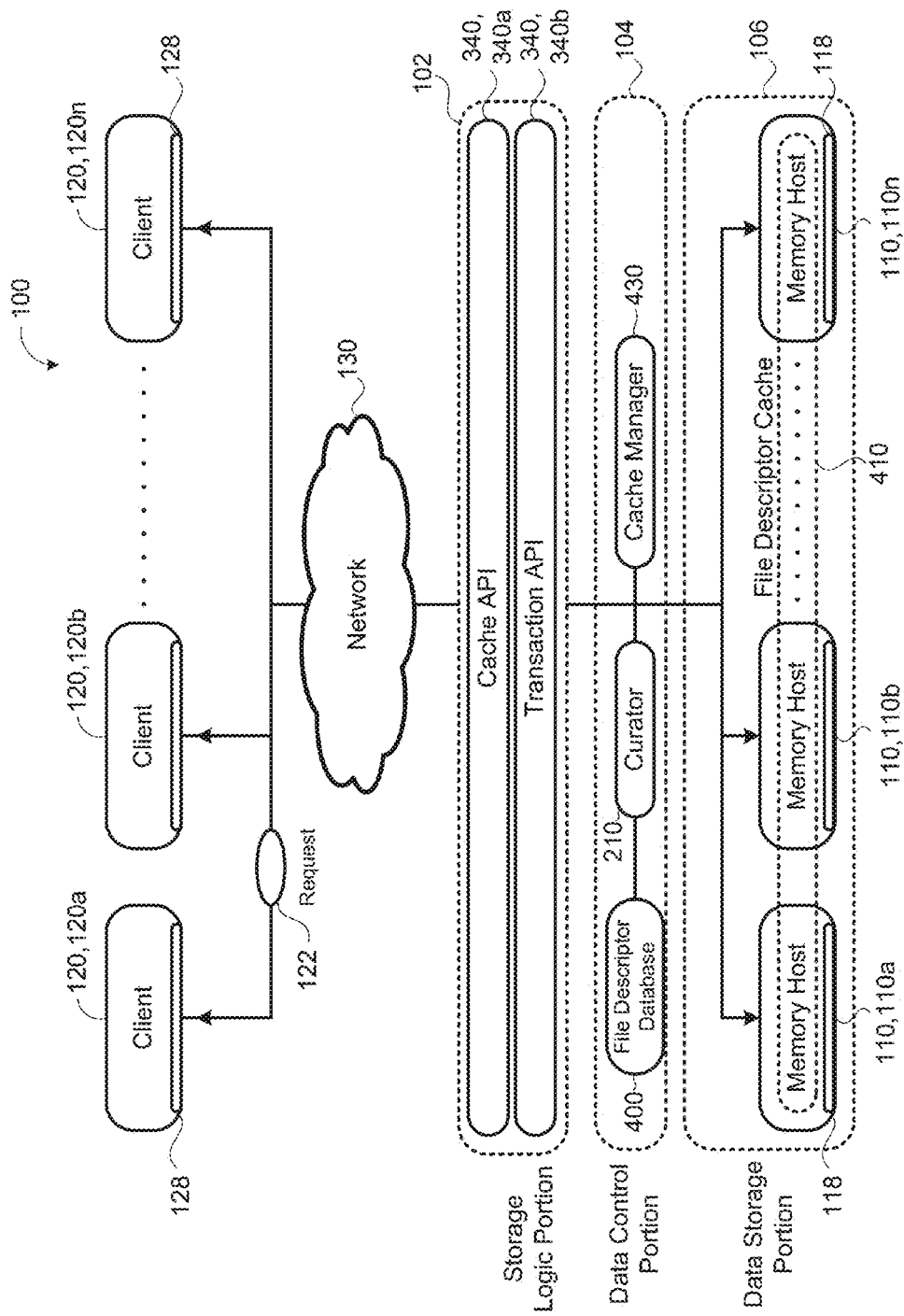
FIG. 1A is a schematic view of an exemplary distributed storage system.
Figure 1B:
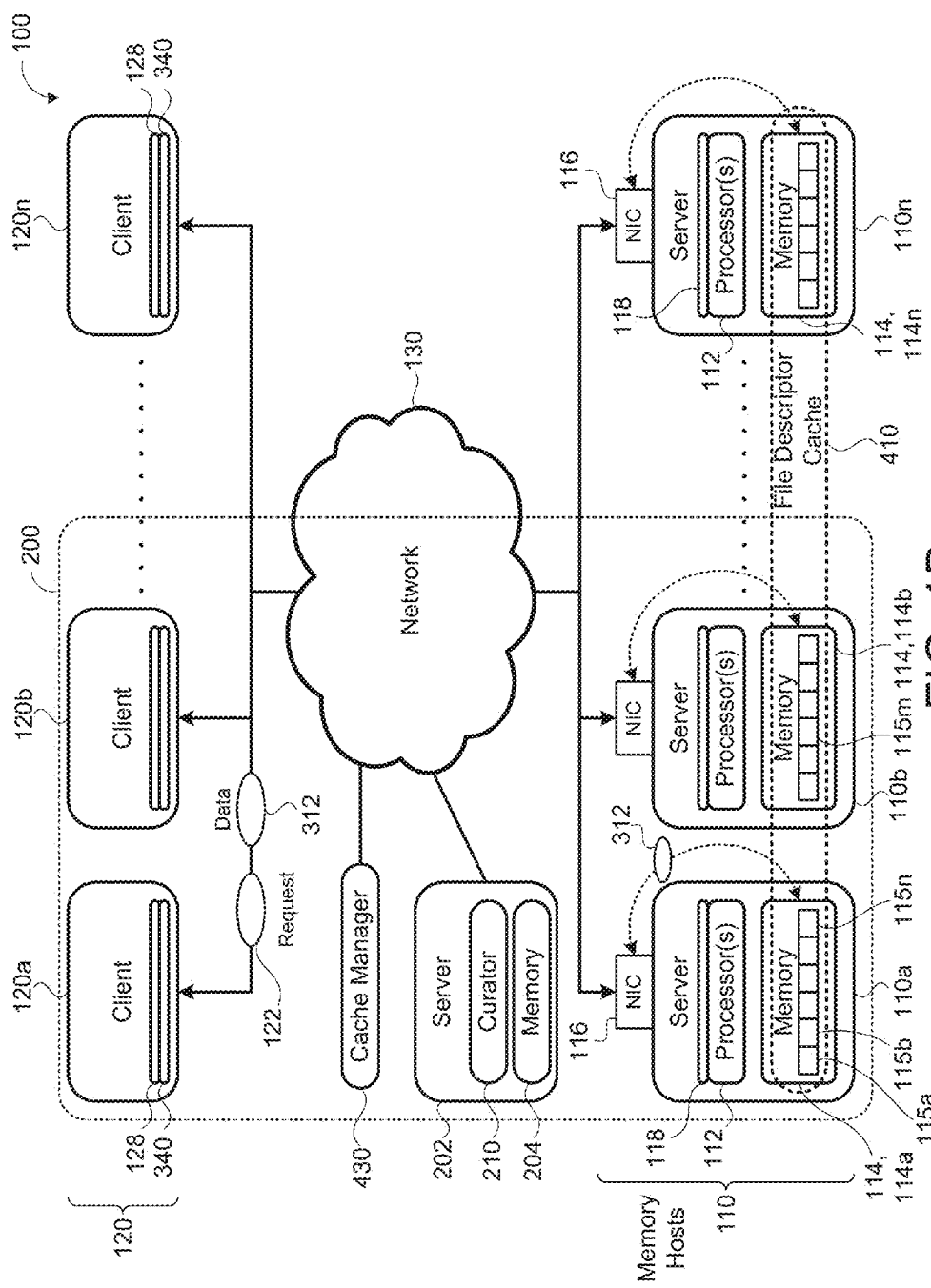
FIG. 1B is a schematic view of an exemplary distributed storage system having a cell of memory hosts managed by a curator.
Figure 1C:
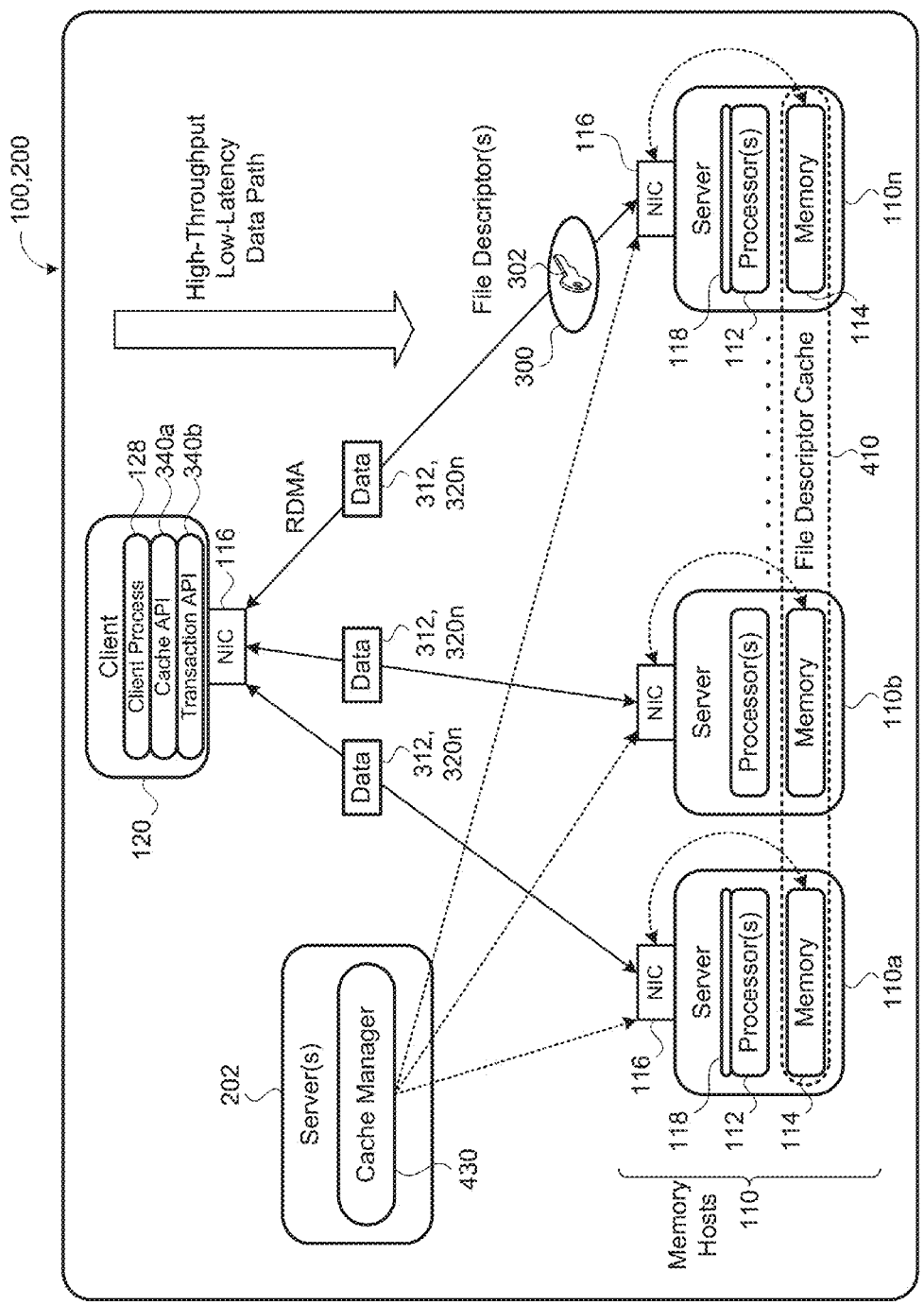
FIG. 1C is a schematic view of an exemplary cell of a distributed storage system.

Referring to FIGS. 1A-1C, in some implementations, a distributed storage system 100 includes loosely coupled memory hosts 110, 110a-n (e.g., computers or servers), each having a computing resource 112 (e.g., one or more processors or central processing units (CPUs)) in communication with storage resources 114 (e.g., memory, flash memory, dynamic random access memory (DRAM), phase change memory (PCM), and/or disks) that may be used for caching data. A storage abstraction (e.g., key/value store or file system) overlain on the storage resources 114 allows scalable use of the storage resources 114 by one or more clients 120, 120a-n. The clients 120 may communicate with the memory hosts 110 through a network 130 (e.g., via RDMA or RPC).

In some implementations, the distributed storage system 100 is "single-sided," eliminating the need for any server jobs for responding to remote procedure calls from clients 120 to store or retrieve data 312 on their corresponding memory hosts 110 and may rely on specialized hardware to process remote requests 122 instead. "Single-sided" refers to the method by which most of the request processing on the memory hosts 110 may be done in hardware rather than by software executed on CPUs 112 of the memory hosts 110. Rather than having a processor 112 of a memory host 110 (e.g., a server) execute a server process 118 that exports access of the corresponding storage resource 114 (e.g., non-transitory memory) to client processes 128 executing on the clients 120, the clients 120 may directly access the storage resource 114 through a network interface controller (NIC) 116 of the memory host 110. In other words, a client process 128 executing on a client 120 may directly interface with one or more storage resources 114 without requiring execution of a routine of any server processes 118 executing on the computing resources 112. This single-sided distributed storage architecture offers relatively high throughput and low latency, since clients 120 can access the storage resources 114 without interfacing with the computing resources 112 of the memory hosts 110. This has the effect of decoupling the requirements for storage 114 and CPU cycles that typical two-sided distributed storage systems 100 carry. The single-sided distributed storage system 100 can utilize remote storage resources 114 regardless of whether there are spare CPU cycles on that memory host 110; furthermore, since single-sided operations 122 (or requests) do not contend for server CPU 112 resources, a single-sided system can serve cache requests 122 with very predictable, low latency, even when memory hosts 110 are running at high CPU utilization. Thus, the single-sided distributed storage system 100 allows higher utilization of both cluster storage 114 and CPU 112 resources than traditional two-sided systems, while delivering predictable, low latency.

In some implementations, the distributed storage system 100 includes a storage logic portion 102, a data control portion 104, and a data storage portion 106. The storage logic portion 102 may include an application programming interface (API) 340, such as a cache API 340a (e.g., software library), that lies between the client application/process 128 executing on a client 120 accessing a distributed cache 410 (e.g., storage resources 114) on the memory hosts 110 and a transaction application programming interface (API) 340b (e.g., a single-sided transactional system client library) that is responsible for accessing the underlying data, for example, via RPC or single-sided operations 122. The data control portion 104 may manage allocation and access to storage resources 114 with tasks, such as allocating storage resources 114, registering storage resources 114 with the corresponding network interface controller 116, setting up connections between the client(s) 120 and the memory hosts 110, handling errors in case of machine failures, etc. The data storage portion 106 may include the loosely coupled memory hosts 110, 110a-n.

The distributed storage system 100 may store cache data 312 (e.g., cache entries 420 including copies of file descriptors 310 and copies of stripe descriptors 303) in dynamic random access memory (DRAM) 114 and serve the data 312 from the remote hosts 110 via RDMA-capable network interface controllers 116. A network interface controller 116 (also known as a network interface card, network adapter, or LAN adapter) may be a computer hardware component that connects a computing resource 112 to the network 130. Both the memory hosts 110a-n and the client 120 may each have a network interface controller 116 for network communications. A host process 118 executing on the computing processor 112 of the memory host 110 registers a set of remote direct memory accessible regions 115a-n of the memory 114 with the network interface controller 116. The host process 118 may register the remote direct memory accessible regions 115a-n of the memory 114 with a permission of read-only or read/write. The network interface controller 116 of the memory host 110 creates a client key 302 for each registered memory region 115a-n.

The distributed storage system 100 may include a co-located software process to register memory 114 for remote access with the network interface controllers 116 and set up connections with client processes 128. Once the connections are set up, client processes 128 can access the registered memory 114 via engines in the hardware of the network interface controllers 116 without any involvement from software on the local CPUs 112 of the corresponding memory hosts 110.

In some implementations, the distributed storage system 100 includes multiple cells 200, each cell 200 including memory hosts 110 and a curator 210 in communication with the memory hosts 110. The curator 210 (e.g., process) may execute on a computing processor 202 (e.g., server having a non-transitory memory 204) connected to the network 130 and manage the data storage (e.g., manage a file system stored on the memory hosts 110), control data placements, and/or initiate data recovery. Moreover, the curator 210 may track an existence and storage location of data 312 on the memory hosts 110. Redundant curators 210 are possible. In some implementations, the curator(s) 210 tracks the striping of data 312 across multiple memory hosts 110 and the existence and/or location of multiple copies of a given stripe for redundancy and/or performance. In computer data storage, data striping is the technique of segmenting logically sequential data 312, such as a file 310 (FIG. 2), in a way that accesses of sequential segments are made to different physical storage devices 114 (e.g., cells 200 and/or memory hosts 110). Striping is useful when a processing device requests access to data 312 more quickly than a storage device 114 can provide access. By performing segment accesses on multiple devices, multiple segments can be accessed concurrently. This provides more data access throughput, which avoids causing the processor to idly wait for data accesses.

In some implementations, the transaction API 340b interfaces between a client 120 (e.g., the cache API 340a, which interfaces with the client process 128) and the curator 210. In some examples, the client 120 communicates with the curator 210 through one or more remote procedure calls. In response to a client request 122, the transaction API 340b may find the storage location of certain data 312 on memory host(s) 110 and obtain a key 302 that allows access to the data 312. The transaction API 340b communicates directly with the appropriate memory hosts 110 (via the network interface controllers 116) to read or write the data 312 (e.g., using remote direct memory access). In the case that a memory host 110 is non-operational, or the data 312 was moved to a different memory host 110, the client request 122 fails, prompting the client 120 to re-query the curator 210. Therefore, the client request 122 only goes to the curator 210 when the client request 122 fails to retrieve data 312 from the memory host 110, which results in a more efficient distributed storage system 100 due to the limited access to the curator 210.

The single-sided operations 122 performed by the network interface controllers 116 may be limited to simple reads, writes, and compare-and-swap operations 122, none of which may be sophisticated enough to act as a drop-in replacement for the software logic implemented by a traditional cache server job to carry out cache requests and manage cache policies. The cache API 340a translates commands, such as look-up or insert data commands, into sequences of primitive network interface controller operations 122. The cache API 340a interfaces with the data control and data storage portions 104, 106 of the distributed storage system 100.

Figure 2:
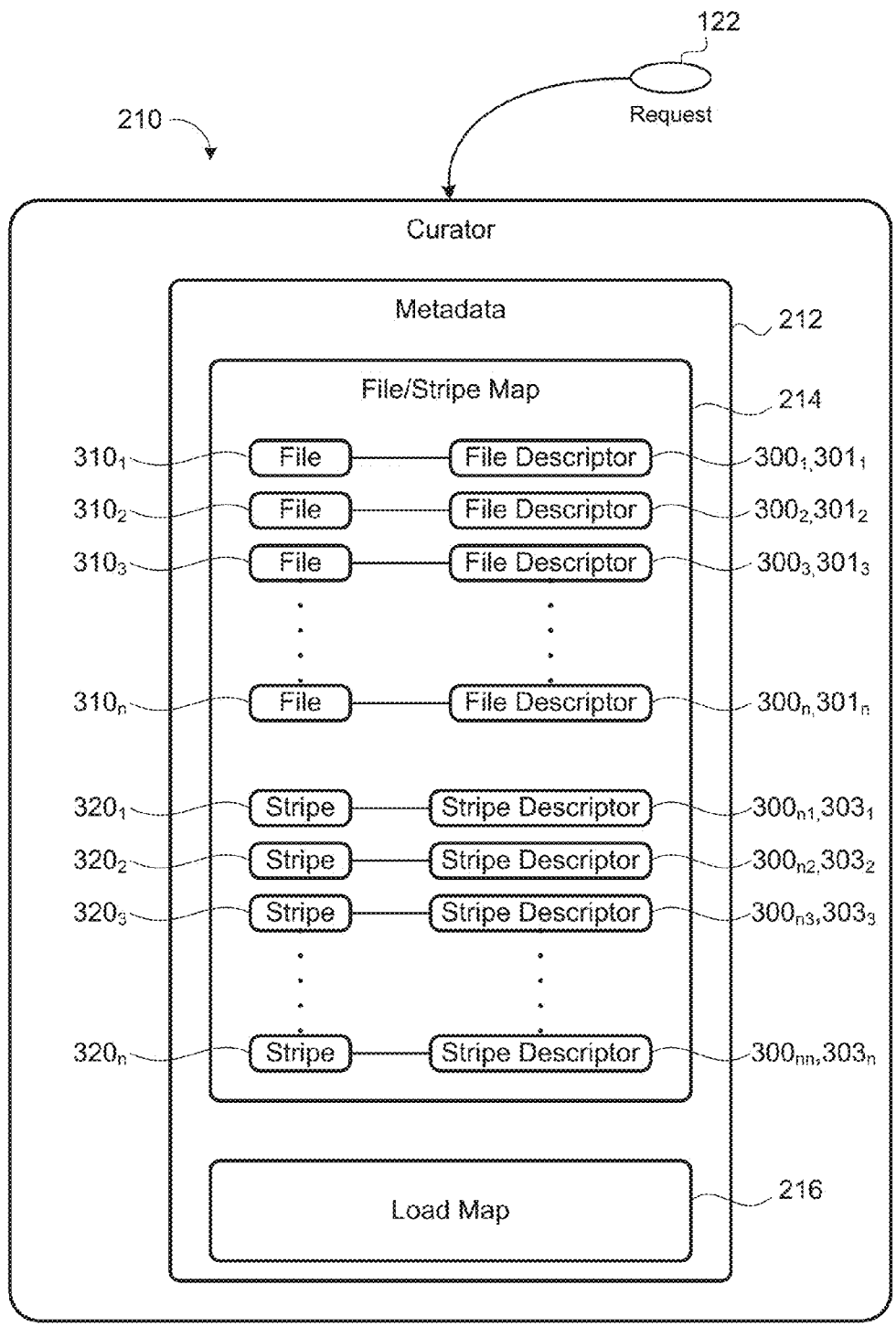
FIG. 2 is a schematic view of an exemplary curator, cache manager, and file descriptor cache database for a distributed storage system.

Referring to FIG. 2, in some implementations, the curator 210 stores and manages file system metadata 212. The metadata 212 may include a file and stripe map 214 that maps files $310_{1-n}$ to file descriptors $301_{1-n}$ and stripes $320_{1-n}$ to stripe descriptors $303_{1-n}$. The curator 210 may examine and modify the representation of its persistent metadata 212.

The curator 210 may use three different access patterns for the metadata 212: read-only, file transactions, and stripe transactions.

Figure 3A:
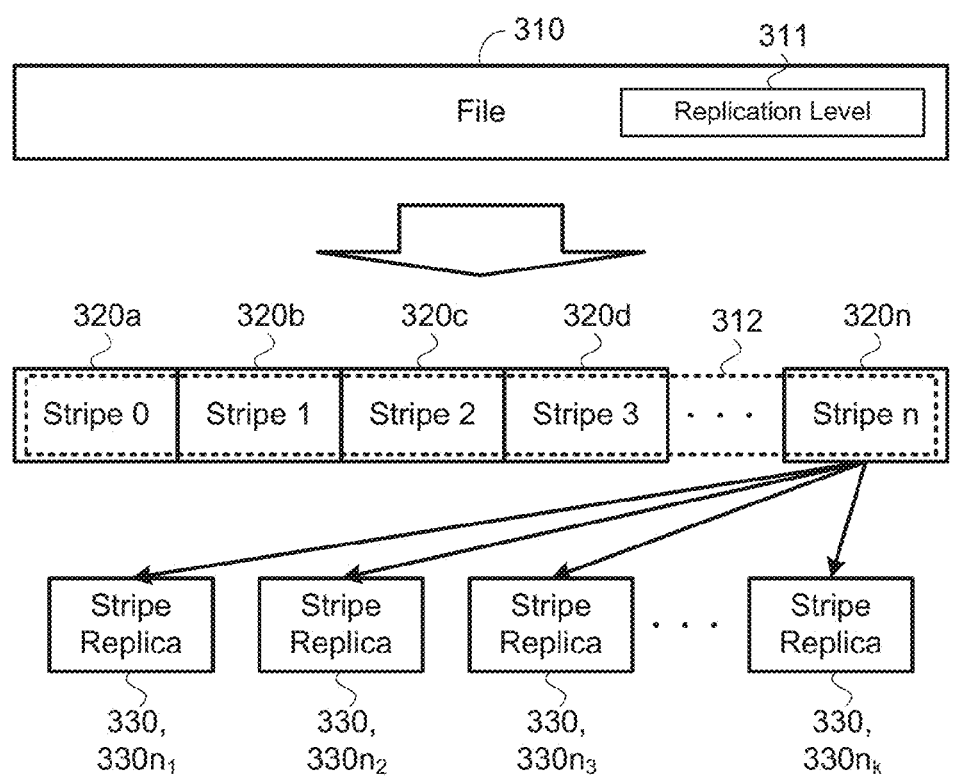
FIG. 3A is a schematic view of an exemplary file split into replicated stripes.
Figure 3B:
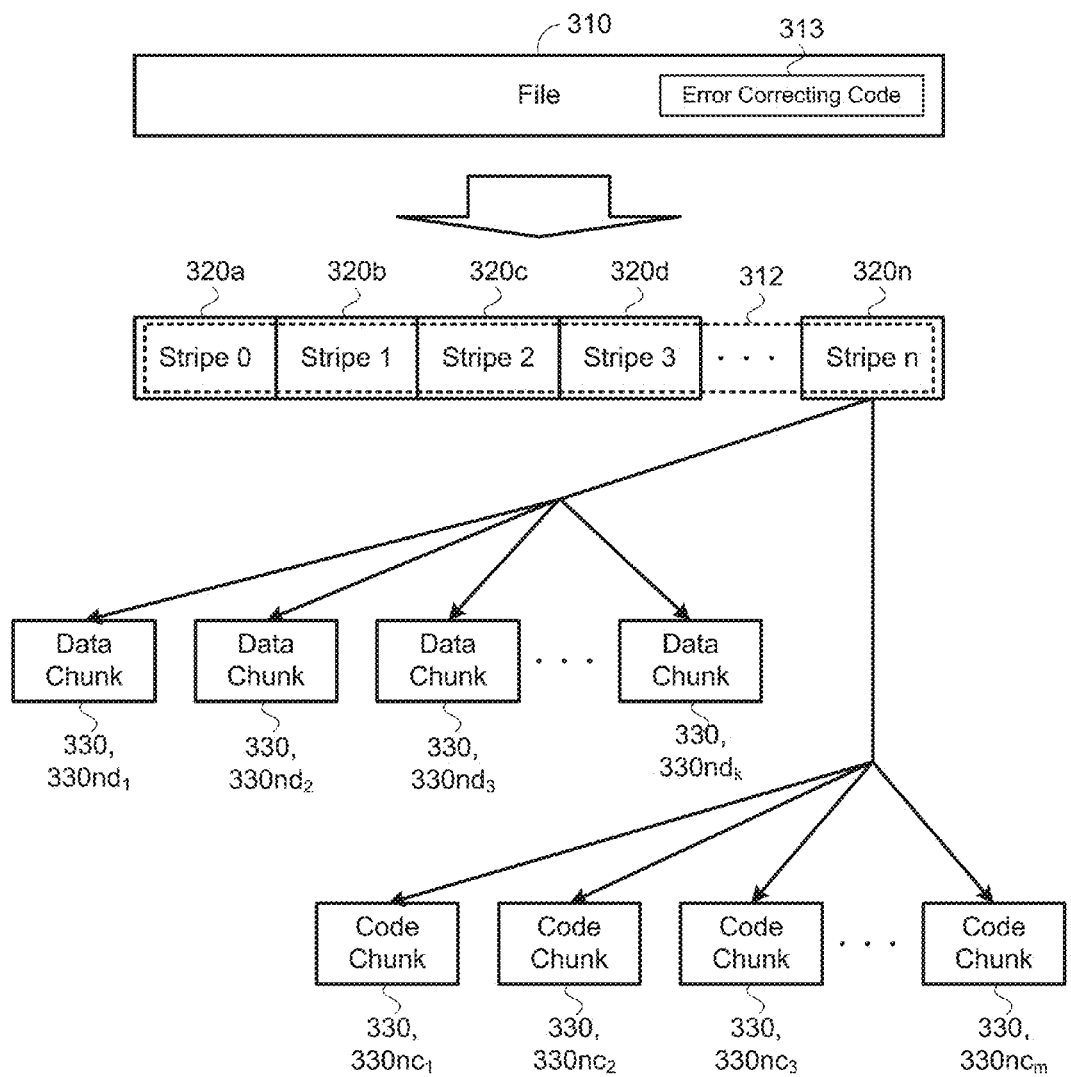
FIG. 3B is a schematic view of an exemplary file split into data chunks and code chunks.

Referring to FIGS. 3A and 3B, data 312 may be one or more files 310, where each file 310 has a specified replication level 311 and/or error-correcting code 313. The curator 210 may divide each file 310 into a collection of stripes 320a-n, with each stripe 320a-n being replicated or encoded independently from the remaining stripes 320a-n. For a replicated file 310, each stripe 320a-n is a single logical chunk that the curator 210 replicates as stripe replicas $330n_k$ and stores on multiple storage resources 114. In that scenario, a stripe replica $330n_k$ is also referred to as a chunk $330n_k$. For an encoded file 310, each stripe 320a-n consists of multiple data chunks $330nd_k$ and code chunks $330nc_m$ that the curator 210 places on multiple storage resources 114, where the collection of data chunks $330nd_k$ and code chunks $330nc_m$ forms a single code word. In general, the curator 210 may place each stripe 320a-n on storage resources 114 independently of how the other stripes 320a-n in the file 310 are placed on storage resources 114. The error-correcting code 313 adds redundant data, or parity data to a file, so that the file can later be recovered by a receiver even when a number of errors (up to the capability of the code being used) were introduced. Error-correcting code is used to maintain data integrity in storage devices, to reconstruct data for performance (latency), or to more quickly drain machines.

Referring back to FIG. 2, in some implementations, descriptors $300_{1-n}$ stored by the curator 210 contain metadata 212, such as the file and stripe map 214, which maps the stripes 320a-n to stripe replicas $320n_k$ or to data chunks $320nd_k$ and code chunks $320nc_m$, as appropriate, stored on the memory hosts 110. To open a file 310 or a portion of the file 310, a client 120 sends a request 122 to the curator 210, which returns a descriptor 300 (e.g., a file descriptor 301 or a stripe descriptor 303). The client 120 uses the descriptor 300 to translate file chunk offsets to remote memory locations 115a-n. The descriptor 300 may include a client key 302 (e.g., a 32-bit key) that is unique to a chunk $320n_k$, $320nd_k$, $320nc_m$ on a memory host 110. The client 120 uses the key 302 to RDMA-read that chunk $320n_k$, $320nd_k$, $320nc_m$. After the client 120 loads the descriptor 300, the client 120 can access the data 312 of a file 310 via RDMA or another data retrieval method. A file descriptor cache 410 (discussed below) stores a copy 300a of the descriptors 300 on the distributed storage system 100. When a client 120 requests a descriptor 300, the client 120 first checks if the descriptor 300 is in the file descriptor cache 410, and only when the descriptor 300 is not found on the file descriptor cache 410 does the client 120 access the curator 210 to retrieve the descriptor 300 from the file descriptor storage 400. This results in a more efficient distributed storage system 100 due to the limited access to the curator 210.

Referring back to FIG. 1A, the descriptors 300 of the distributed storage system 100 may be stored in file descriptor storage 400 (e.g., a file descriptor database). When a client 120 sends a request 122 to the curator 210, the curator 210 receives the request 122 and returns to the client 120 a file descriptor 301 after retrieving the file descriptor 301 from the file descriptor storage 400. In some examples, the file descriptor 301 of a file 310 has a number of stripes 320 that spans multiple columns within the file descriptor storage 400 including strip descriptors 303 in various columns. A client 120 accessing a file 310 may look up the descriptor 301 associated with the whole file 310 or of a stripe descriptor 303 associated with a specific stripe 320 and then proceed to read data from the memory hosts 110 and address specified in the file descriptor 301 or stripe descriptor 303 using RDMA.

The curator 210 may maintain status information for all memory hosts 110 that are part of the cell 200. The status information may include capacity, free space, load on the memory host 110, latency of the memory host 110 from a client's point of view, and a current state. The curator 210 may obtain this information by querying the memory hosts 110 in the cell 200 directly and/or by querying a client 120 to gather latency statistics from a client's point of view. In some examples, the curator 210 uses the memory host status information to make rebalancing, draining, recovery decisions, and allocation decisions.

The curator(s) 210 may allocate chunks 330 in order to handle client requests 122 for more storage space in a file 310 and for rebalancing and recovery. In some examples, the processor 202 replicates chunks $330n_k$ among the storage devices 114 differently than distributing the data chunks $330nd_k$ and the code chunks $330nc_m$ among the storage devices 114. The curator 210 may maintain a load map 216 of memory host load and liveliness. In some implementations, the curator 210 allocates a chunk 330 by generating a list of candidate memory hosts 110 and sends an allocate chunk request 122 to each of the candidate memory hosts 110. If the memory host 110 is overloaded or has no available space, the memory host 110 can deny the request 122. In this case, the curator 210 selects a different memory host 110. Each curator 210 may continuously scan its designated portion of the file namespace, examining all the metadata 212 every minute or so. The curator 210 may use the file scan to check the integrity of the metadata 212, determine work that needs to be performed, and/or to generate statistics. The file scan may operate concurrently with other operations 122 of the curator 210. The scan itself may not modify the metadata 212, but schedules work to be done by other components of the system and computes statistics.

In some examples, multiple clients 120 share files 310 or stripes 320, which may lead to several clients 120 requesting the same descriptor 300 from the curator 210. This may increase the load on the curator 210, in particular, on its processor 202 (e.g., computational resource from a process on the remote host 110), which may potentially hurt the performance of the distributed storage system 100. For example, if some of the memory hosts 110 become inactive and the curator 210 has an increased load on its processor 202 (e.g., due to multiple clients 120 rushing to the curator 210 to obtain the same file descriptor 300), multiple clients 120 may notice that they cannot access a common set of stripes $300_{a-n}$; then all clients 120 may notify the curator 210 that they are unable to access the common set of stripes $300_{a-n}$ and request updated information on the down or moved stripe 320 from the curator 210. Even if the clients 120 access file data through an RDMA operation, versus an RPC, the clients 120 would need to request the corresponding descriptor(s) 301 from the curator 210, which would burden its processor 202, if requested through an RPC. Accessing descriptors 301 through an RDMA operation decouples the accessibility of the file descriptors 301 from any server job resource usage.

A file descriptor cache 410 stores a copy 300a of the descriptors 300 (e.g., a copy of the file descriptors 301 and a copy of the stripe descriptors 303) on the distributed storage system 100 (e.g., in RDMA accessible memory 114 of the memory hosts 110). The file descriptor storage 400 remains the main repository and the system of record for the file descriptors 301 and the stripe descriptors 303. However, when a client 120 requests a descriptor 300, the client 120 first checks if the descriptor 300 is in the file descriptor cache 410, and only when the descriptor 300 is not found on the file descriptor cache 410 does the client 120 access the curator 210 to retrieve the descriptor 300 from the file descriptor storage 400. The client 120 may access the file descriptor cache 410 through RDMA, allowing quicker and more efficient retrieval of the descriptor 301 compared to a remote procedure call to the curator 210 and/or the file descriptor storage 400. In some examples, the file descriptor cache 410 is a subset of the file descriptor storage 400; therefore the file descriptor storage 400 includes the file descriptor cache 410.

Figure 3C:
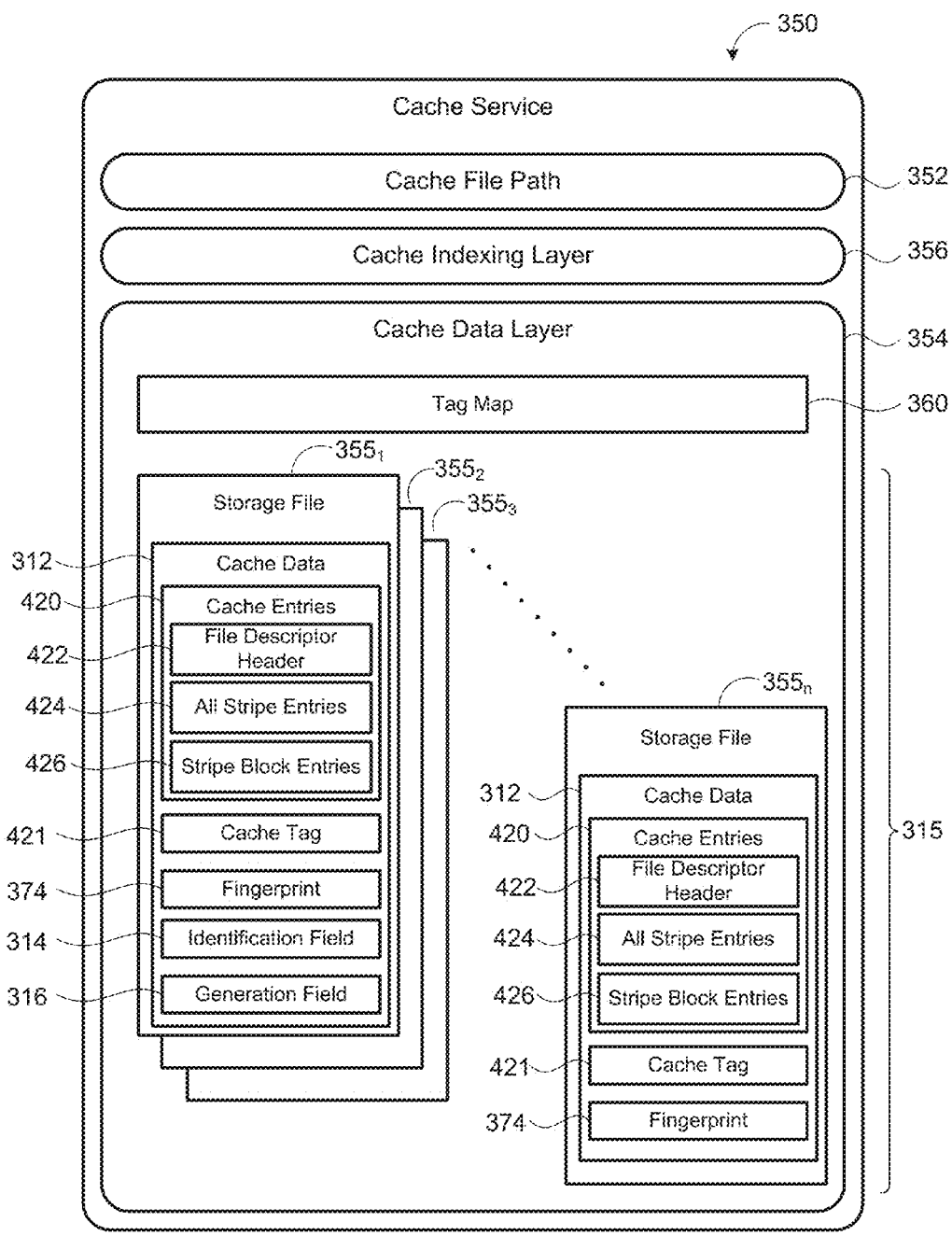
FIG. 3C is a schematic view of an exemplary cache service.
Figure 3D:
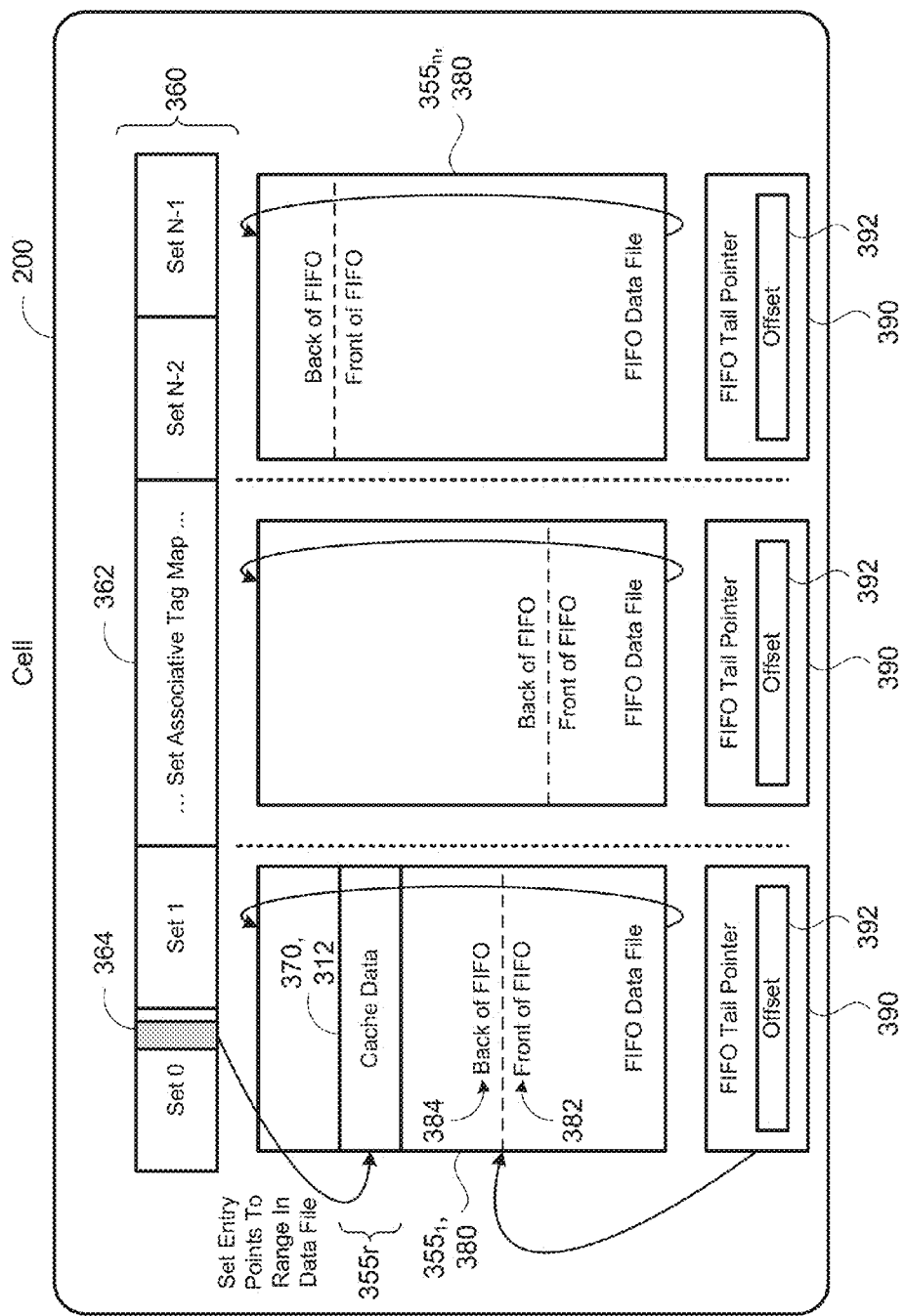
FIG. 3D is a schematic view of an exemplary tag map and associated circular data files.

Referring to FIGS. 3C and 3D, in some implementations, the distributed storage system 100 includes a cache manager 430 that manages and maintains cache entries 420 (e.g., copies of file descriptors 310 and copies of stripe descriptors 303) using a cache service 350 (e.g., SharedFifoCache) that stores data 310 on the storage system 100. The file descriptor cache 410 is located in a memory space on RDMA accessible memory 114 of the memory hosts 110 that is known by clients 120. A cache service instance 350 includes a set of storage files 355 that store cache data 312 such as descriptors $300_{1-n}$ contained within a directory of the file system of the distributed storage system 100. Thus, a cache service instance 350 can be identified by a file path 352 containing the descriptors 300 (e.g., passing a cache path parameter to open a handle to a cache instance). The cache service 350 may include two caching layers: a cache data layer 354 and a cache indexing layer 356. The cache data layer 354 stores cache data 312 (e.g., descriptors 300) in storage files 355 and the cache indexing layer 356 indexes the cache data 312 stored in the storage files 355. The cache indexing layer 356 may have a set associative placement policy and a first in/first out (FIFO) replacement policy within each set 362 of a tag map 360. The cache data layer 354 may be sharded into many separate storage files 355 (e.g., circular data files). An instance of a cache service 350 may include two types of data structures laid out in the storage files 355 of the distributed storage system 100: a set 315 of circular data storage files 355 and a set associative tag map 360. Moreover, the cache service 350 may be associated with a cell 200 of distributed storage system 100.

The cache data layer 354 includes circular storage data files 355, which contain the actual cached data 312 (e.g., descriptors 300). Each cache entry 370 in the circular data files 355 contains cache data 312, which includes: cache entries 420 (e.g., file descriptor headers 422, stripes entries 424, and stripe block entries 426), a cache tag 421, and a fingerprint 374 to aid in identifying the cache data entry 370 during look up and insert operations 122, for example. The circular data files 355 may have a fixed size and evictions may occur in a first-in-first-out (FIFO) order when additional space is needed. Each circular data file 355 includes a FIFO queue 380 having a front 382 and a back 384. An offset 392 to the front 382 of the FIFO queue 380 of the circular data file 310 can be stored in an auxiliary tail pointer file 390. Thus, the construct of a circular data file 355 may actually include two physical files. The caching service 350 may shard the cache data 312 into a set 315 of many circular data files 310 via consistent hashing. This allows tuning of the cache for contention, as concurrent insertion operations 122 to the data files 310 may contend for the back 384 of the queue 380. Circular data files 355 in a given cache file path 352 may be identified by a 32-bit integer identifier so that pointers to data files 310 can be limited to a fixed, small size.

The set associative tag map 360 may function as an index of the cache data 312 (e.g., descriptors 300) stored in the storage data files 355. The set associative tag map 360 maps cache tag fingerprints 374 to locations of the corresponding cache data 312 (e.g., descriptors 300) in the circular data files 310 (i.e., a struct containing a data file ID, offset 392, and size of the cache entry 370). The caching service 350 may implement the mapping as a set associative cache, where the cache tags 421 are 64-bit fingerprints and the data payloads 312 are pointers to regions 355r of circular data files 355 (e.g., memory regions 114a-n). Eviction within each set 362 of the tag map 360 may be handled in a FIFO order. In practice, the tag map 360 can be sized to ensure that conflict misses caused by its restrictive placement policy are rare, so that the tag map 360 can be considered a mostly-complete index for the data 312 contained in the circular data files 310. Moreover, the tag map 360 may be stored in a storage file 355.

In some implementations, the cache API 340b implements cache operations including look up, insert, and remove operations 122. The cache look up operation of a cache tag 421 identifies the cache tag 421 in the tag map 360 by fingerprinting the cache tag 421 to obtain a corresponding fingerprint 374 and then applying a mapping function to map the fingerprint 374 to a set 362 in the tag map 360. The client 120 may read the set 362 from the file descriptor cache 410 and search for a cache entry 370 matching the fingerprint 374. If a result is not found, the look up operation reports a cache miss; if the result is found, the look up operation reads a region 355r of the corresponding circular data file 355 pointed to by the cache entry 370. The look up operation checks that the data 312 read actually corresponds to the cache tag 421, and returns a hit with the corresponding data 312, as illustrated in FIG. 3C. In some implementations, the cache look up operation does not need to modify any globally shared state (e.g., book-keeping of most recently used timestamps), but rather can be a read-only operation. Alternatively, the cache look up operation may modify some shared space, shared statistics, counters, or states that may help implement some other caching policy, such as least recently used (LRU), random, not most recently used, etc. File access may be implemented with a transactional protocol that ensures that a cache access is atomic and serializable with respect to concurrent mutations.

Referring to FIG. 3D, in some implementations, the cache insert operation receives a cache tag 421 with the data 312 and selects a circular data file 355 for insertion of the data 312 by taking a consistent hash of the cache tag 421. The cache insert operation executes a push back operation to add a cache entry 370 containing the cache tag 421 and the data 312 to the back 384 of the FIFO queue 380 of the selected circular data file 355. The push back operation includes reading an offset 392 of the back 384 of the FIFO queue 380 of the circular data file 310 from a corresponding tail pointer file 390. If there is not enough room between the offset 392 and an end of the circular data file 310 to store the cache entry 370, the push back operation wraps around to the beginning (i.e., the front 382) of the circular data file 355 by taking the offset 392 to be zero. The push back operation also includes reading a region 355r of the circular data file 355 that may be overwritten and parse out a set of cache tags 421 being evicted. The push back operation includes writing the cache entry 370 (the cache tag and data pair) to the circular data file 310 at the offset 392 and writing a new offset 392 to the tail pointer 390 (e.g., the previous offset 392+a size of the cache entry 370).

The file descriptor cache 410 may be organized to address the two ways that a client 120 may access information about descriptors 300: first, a client 120 may want the whole file descriptor 300 (e.g., LookUp operation), second, a client 120 may want information on specific stripes $320_{a-n}$ of the file 310 (e.g., LookUpStripes operation). Both access operations 122 retrieve descriptor information 300 (e.g., file descriptors 301 or stripe descriptors 303). When the client 120 wants the whole file 310, the distributed storage system 100 may retrieve file descriptor information 303 on all the stripes 320 of the file 310, and when the client 120 requests a specific stripe or block of stripes 320 then the distributed storage system 100 retrieves information pertaining to that specific stripe 320 or block of stripes 320.

In some implementations, the file descriptor cache 410 includes three types of entries 420 (i.e., descriptor 300): entries that contain the file descriptor 301 minus the stripe descriptors 303 called the file descriptor headers 422; entries that contain all stripes 320 of the file descriptor 301 called all stripes entries 424; and entries that contain a subset of the stripes 320 up to a given "block size" called stripe block entries 426. A block size is the maximum number of stripes 320 in a stripe block entry 426 and is determined by a value in the cell configuration 200. The all stripes entry 424 (containing all stripes 320 of the file descriptor 301) is similar to a modified stripe block entry 426.

In some implementations, the distributed storage system 100 uses the stripe block entries 426 to address instances where the client 120 looks up the stripe descriptors 303 of specific stripes $320_{a-n}$ or when the client 120 looks up stripe descriptors 303 of a specific range of stripes $320_{a-n}$. In addition, the dual use of stripe block entry 426 allows the distributed storage system 100 to minimize the number of cache entries 420 used (which in turn improves the capacity of the file descriptor cache 410 and the number of requests 122 it can service), and the number of cache entries 420 looked up (for each cache look up, an RDMA operation occurs and multiple RDMA operations 122 may occur concurrently). In some examples, the file descriptor cache 410 stores the file descriptor header 422 as a separate entry to reduce redundancy in storage and to provide a mechanism to check consistency of entries.

In some implementations, each file descriptor entry 420 (e.g., file descriptor headers 422, stripes entries 424, and stripe block entries 426) is associated with a tag 421. The tag 421 includes the path of the file 310 or stripe 320 corresponding to the descriptor 300. In some examples, the tag 421 associated with the file descriptor header entry 422 includes the whole file path. The tag 421 associated with all stripes entry 424 includes the whole path plus a "{all-stripes}" suffix that includes characters ("{", "}") that are not allowed in a normal file 310 (to prevent conflicts with other file path-based tags). The tag 421 associated with the stripe block entries 426 includes the whole path plus a "{stripe-block}% dTo % d" suffix, with the "% d"'s representing the start index and end index (inclusive) for the block based on the stripe block size obtained from the cell configuration 200. The start and end index of the stripe $320_{a-n}$ depends on the block size. The stripe block may itself have fewer stripes 320, starting with an index greater than or equal to the start index and ending at an index less than or equal to the end index.

The cache manager 430 is responsible for updating the file descriptor cache 410 and preventing stale descriptors 301. In an example, a first client 120 makes a call to the curator 210 and receives a version of a file 310 at time $T_1$, while a second client 120 gets a version of the same file 310 at time $T_2$ due to differences in processing and transmission times, where $T_2 > T_1$. However, the second client 120 may end up updating the file descriptor cache 410 before the first client 120, and the file descriptor cache 410 may end up with the version of the file 310 from $T_1$, even though the file 310 has clearly been updated since. Therefore, the cache manager 430 verifies that the cached files 310 are up to date and prevents situations as mentioned in the example.

Figure 4A:
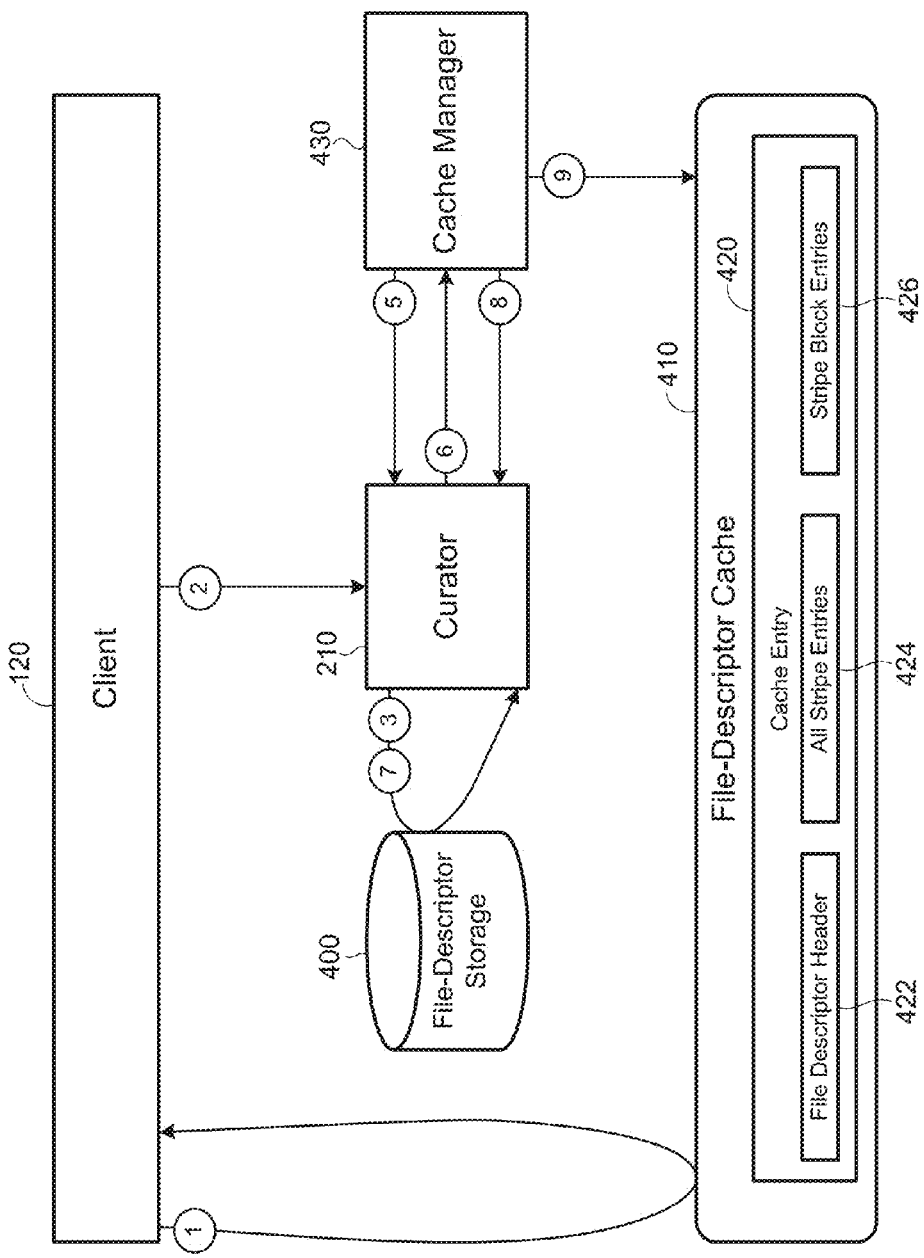
FIGS. 4A and 4B are schematic views of the communications between the components of the exemplary distributed storage system.
Figure 4B:
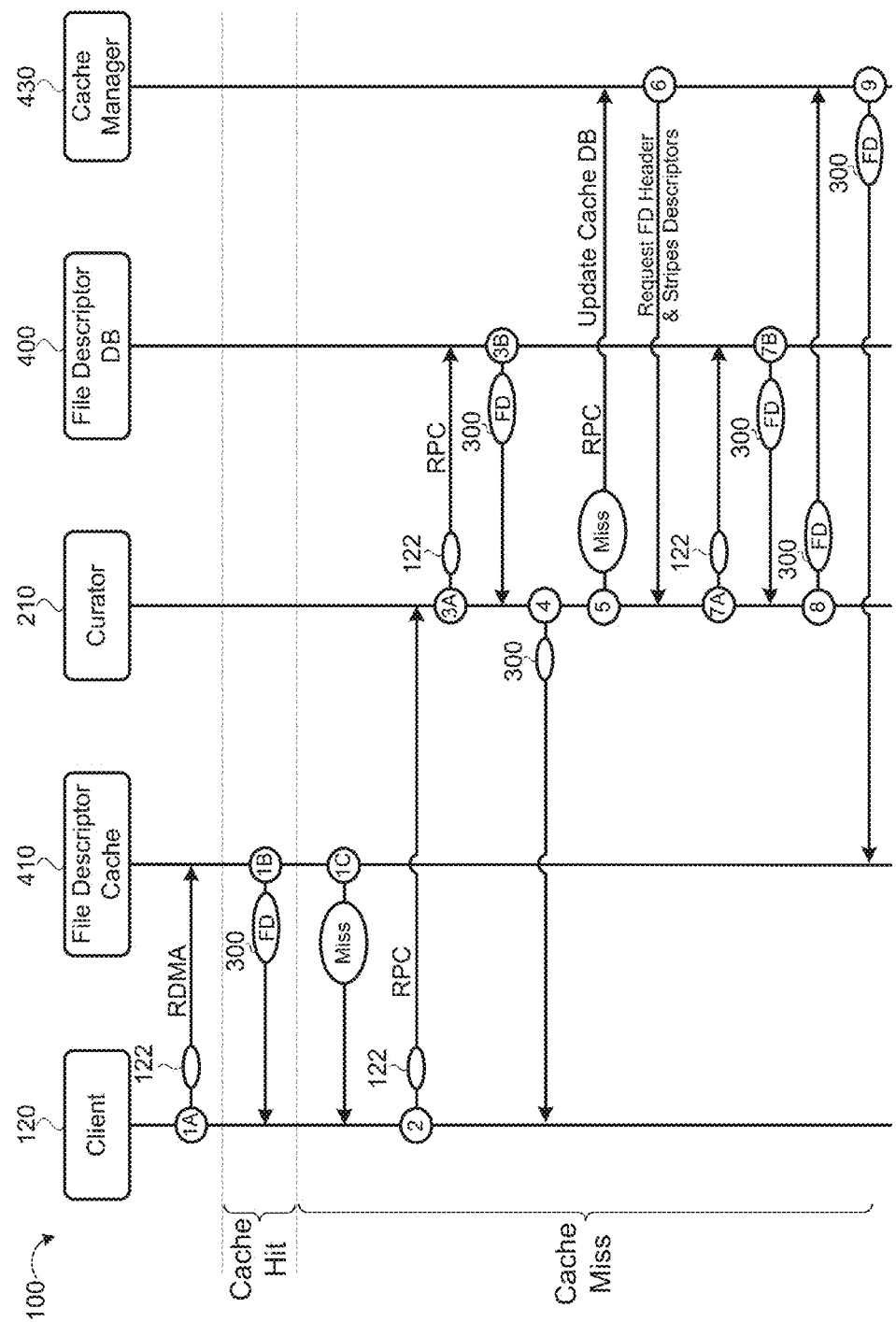

FIGS. 4A and 4B show the communication within the distributed storage system 100. The client 120 requests information about a file 310 using the LookUp operation (that looks up file descriptors 301 for an entire file 310) or stripes 320 using the LookUpStripes operation (that looks up descriptors for a specific set of the file descriptor's stripes) and the NotifyError (that looks up descriptors for a specific stripe the client 120 encountered an error accessing). Notify Error is a special form of LookUpStripes, because it accesses the file descriptor cache 410 in a similar manner. The requests 122 (e.g., LookUp, LookUpStripes, and NotifyError) are made through the transaction API 340b, which results in RPCs to the file descriptor cache 410.

The file descriptor cache API 342 receives the request 122 and checks whether the requested entries 420 are present in the file descriptor cache 410 by translating the path and the stripe numbers (the latter only in the case of LookUpStripes) into a set of cache tags 421 (with the full file path with a suffix based on the stripe numbers serves as a unique tag), and then the file descriptor cache API 340 looks up the value corresponding to these tags 421. If a cache entry 420 (e.g., a copy of a file descriptor 300) exists according to the cell configuration 200 and it has been opened successfully, the LookUp operation looks up the cache entries 420 for the file descriptor header 422 and all stripes entries 424. If the cache lookup is successful, the client 120 forms a complete file descriptor 301 from the returned file descriptor header 422 and all stripes cache entries 424, and returns this file descriptor 301 as the result of the LookUp. If either the file descriptor header 422 or all stripes entry 424 lookup takes too long, or if either entry 422, 424 is not found, or if the entries 422, 424 are not consistent with each other, the cache API 340a makes the corresponding request 122 to the curator 210 to request the descriptor 300 from the main file descriptor storage 400.

The LookUpStripes request 122 is handled similar to the LookUp call 122. First, the cache API 340a translates the original request 122 for stripe descriptors 303 into requests 122 for corresponding stripe descriptor blocks in the file descriptor cache 410 based on the requested stripe indices. The LookUpStripes call 122 allows the requested stripes 320 to be specified as a collection of specific stripe indices or as a range of stripe. In either case, the set of stripe blocks are requested from the file descriptor cache 410 in a manner that covers the entire set of requested stripes 320.

In some examples where the client 120 requests specific stripes 320, the cache API 340a requests stripe blocks in block size ranges in such a way that they cover the entire set of requested stripes 320. If the requested stripes 320 are invalid, the cache API 340a looks up a non-existent stripe block that should result in cache miss. Based on the file descriptor header 422, however, the cache API 340 determines whether the request 122 made was for valid stripes 320 and interprets the associated miss accordingly.

In some examples, when the client 120 requests a range of stripes 320 from a given stripe index up to the end of the file 310, the end of the range defined by the file's last stripe index is unknown until the file descriptor header 422 is actually accessed. This variant of the LookUpStripes requires a two-phase lookup with the file descriptor header 422 looked up in the file descriptor cache 410 in the first phase. If that lookup succeeds, the client 120 determines the number of stripes 320 in the file 310 using the size of the file 310 and file descriptor header 422. With the range of needed stripe indices completely specified, the client 120 deciphers the set of needed stripe block entries 426 (and their associated cache tags 421). The client 120 may use these tags 421 in a second phase of lookups to retrieve the needed stripe blocks 426.

Once the file descriptor header 422 and stripe block cache entries 426 have been successfully obtained from the file descriptor cache 410, the client 120 forms a file descriptor 301 using the file descriptor header 422 and stripe descriptors 303 corresponding to the stripe indices specifically requested in the LookUpStripes call and returns this file descriptor 301 to the client 120. Similar to the LookUp call, a failed lookup, a missing entry, or inconsistencies mismatch between the file descriptor header 422 and any of the stripe block entries 426 results in a call to the curator 210 to request the file descriptor header 422 and specific stripe descriptors 303.

In some implementations, the descriptor 300 includes an identification field 314 (e.g., ID field), see FIG. 3C. The curator 210 uses the ID field 314 to differentiate between deleted and recreated files 310 or stripes 320 that have the same path. The descriptor 300 may also include a generation field 316, which the curator 210 uses to distinguish between changed descriptors 300 with a given ID field 314. Therefore, the curator 210 and/or cache manager 430 may use both the ID field 314 and the generation field values 316 of the descriptor 300 to ensure that cache entries 420 are consistent.

Since the file descriptor header entry 422 is always updated when the distributed storage system 100 updates the file descriptor cache 410 (an update consists of the file descriptor header 422 and all stripes entries 424, or the file descriptor header 422 and one or more stripe block entries 426) and looked up when the distributed storage system 100 executes a file descriptor cache 410 lookup, the distributed storage system 100 can detect inconsistencies and revert to looking up descriptors 301 via the curator 210. Therefore, changing the file descriptor's header's generation number 316 or file identification 314 on an update unilaterally invalidates any stripe block entries 426 or all stripes entry 424 associated with the old generation number 316 or file identification 314, obviating the need to individually invalidate these stale cache entries 420. For example, a file descriptor header entry 422, the corresponding all stripes entry 424, and a few corresponding stripe block entries 426 are all in the file descriptor cache 410 with generation (G) 316. If the file descriptor 301 is resized, the resize operation at the curator 210 increments the generation number 316 of the file 310 in the file descriptor header 422, and the resulting file descriptor cache 410 update (discussed later) replaces the file descriptor header 422 and all stripes entries 424 with ones that have generation (G+1) 316. If a client 120 now does a LookUpStripes operation and tries to access any of the stripe block entries 426, the system 100 discovers a mismatch between the generation field 316 of the stripe block entries 426 (G) and the file descriptor header entry 422 (G+1).

The curator 210 triggers the cache manager 430 to carry out updates of the file descriptor cache 410. In some implementations, three classes of operations 122 cause the curator 210 to trigger the cache manager 430 to update: 1) LookUp and LookUpStripes requests 122 made to the curator 210; 2) certain types of client error notifications; and 3) file or stripe transactions that result in a change to the file 310 or stripe descriptor 300 in its file descriptor storage 400. When the curator 210 receives a LookUp or LookUpStripes request 122, the curator 210 interprets the received call 122 as a notification of a file descriptor cache 410 miss requiring the file descriptor cache 410 to be updated. An error notification that a descriptor 300 is stale is also similar and needs an update of the file descriptor cache 410 so that new clients 120 encountering the same stale descriptor 300 can get an updated version from the file descriptor cache 410. Finally, a transaction to update a file or stripe descriptor 300 at the curator 210 triggers an update to the file descriptor cache 410 for similar reasons, so clients 120 can obtain the updated descriptor 300 from the file descriptor cache 410 rather than from the curator 210.

In some implementations, the curator 210 triggers the cache manager 430 to update by making two types of RPCs requests to the cache manager 430. The first type is a PullFileDescriptor request, which is when a file is being updated/looked up at the curator 210. The second type is a PullStripeDescriptor request, which is when a stripe is being updated/looked up at the curator 210.

In some implementation, the curator 210 notifies the cache manager 430 to update by making a PullFileDescriptor and PullStripeDescriptor requests (which model a 'pull' model for the cache manager 430. The curator 210 notifies the cache manager 430 that some of the descriptors 300 need to be updated. The cache manager 430 pulls that file descriptor 300 from the curator 210. In yet another example, the 'push' model may be used. In the 'push' model, the curator 210 sends SetFileDescriptor or SetStripeDescriptor requests to the cache manager 430 that contains the descriptors 300. The cache manager 430 puts the requested descriptor 300 directly in the file descriptor cache 410 without requesting the descriptors 30 from the curator 210, which reduces the load on the curator 210. Additionally, the system 100 uses the generation numbers 316 to track the file descriptor header 422 and stripe entries 424, 426, and the cache manager 210 checks the entries 420 that currently exist in the cache (if any) before inserting the entries given in the SetFileDescriptor or SetStripeDescriptor requests 122, and validating that the generations numbers 316 of the entries in the file descriptor cache 410 are older than those in the given descriptors 300. If the entries are not older, then the system does not update the entries.

As previously discussed, the cache manager 430 updates the cache descriptor 300 in response to a request 122 (e.g., RPC) from the curator 210. The cache manager 430 works similar to a client 120, because to respond to PullFileDescriptor RPC request and PullStripeDescriptor RPC request from the curator 210, the cache manager 430 makes LookUp or LookUpStripes calls (respectively) on a curator handle that it created and requests the complete file descriptor 301 or a specific set of stripe descriptors 303, respectively, from the curator 210. In some examples, when the curator 210 makes the PullStripeDescriptor RPC request, the cache manager 430 uses the set of stripes requested by the curator 210, which the client 120 originally requested from the curator 210, to derive stripe indices for the entire set of stripe blocks that cover the requested set of indices.

The cache manager 430 ensures that one operation (e.g., LookUp or a LookUpStripes) per descriptor 300 is in flight to the curator 210 to prevent the distributed storage system 100 from getting out-of-order responses from the curator 210, which may in turn result in updates to the file descriptor cache 410 with potentially stale out-of-order data. A single operation in flight per descriptor 300 avoids the stale out-of-order data. The cache manager 430 maintains a single entry 420 queue of pending operations 122.

For example, if a request 122, such as the LookUp operation 122 is in flight for a given file descriptor 300 to the curator 210, and a new PullFileDescriptor request arrives, the cache manager 430 enqueues a new LookUp operation 122 onto this single entry queue. Any further LookUp operations 122 can be dropped, since a LookUp operation is already enqueued and that operation (when it is eventually executed) may retrieve a snapshot of the descriptor 300 from the curator 210 that is temporally after the dropped LookUp operation, so any update that the PullFileDescriptor request was made for (or an even fresher version) makes it to the file descriptor cache 410.

In another example, a LookUp operation 122 may be initiated from the cache manager 430 at time T1, and it fetches the file descriptor 300 as at time T2 (>T1). The curator 210 may send a PullFileDescriptor request at time T3. If T3<T2, then the LookUp that was initiated at time T1 received the updated snapshot of the file descriptor 300. If T3>T2, the corresponding LookUp operation must be created at the cache manager 430 at time T4 (that is necessarily >T3 and therefore >T1). The new LookUp operation 122 may either find the original LookUp initiated at time T1 that is still in progress (if the file descriptor 300 from time T2 has not yet arrived or that processing that response is taking a while), or that it has completed. Therefore, the new LookUp is added to the queue if there is no other operation pending or it may be dropped if a LookUp is already enqueued. The enqueued LookUp at the cache manager 430 retrieves a file descriptor 300 with the update of T3 that causes the PullFileDescriptor to be launched. In some examples, if a LookUp operation is already enqueued and a PullStripeDescriptor request arrives, the latter should cause an update to a corresponding set of stripe blocks in the file descriptor cache 410. The LookUp may retrieve the entire file descriptor 301 (including all the stripe descriptors 303). Any further LookUpStripes operations 122 can simply add to the list of pending stripes 320, with the operation itself being dropped. The same applies when the pending operation is a LookUpStripes operation 122 and a LookUp operation 122 (in response to a PullFileDescriptor request) arrives. The cache manager 430 may convert the pending operation 122 to a LookUp operation 122 with the set of stripes 320 from the initially enqueued LookUpStripes operation 122 being noted for post-LookUp operation 122. Finally, if a LookUpStripes operation 122 is pending and another LookUpStripes operation 122 (in response to a PullStripeDescriptor request) arrives, the cache manager 430 may add the additional stripes 320 that this new operation 122 is looking for to the set of stripes 320 in the already pending LookUpStripes operation 122 and discard the operation 122. When that pending operation 122 completes, the cache manager 430 may update the stripe descriptors 303 from all of the LookUpStripes operations 122 included into it.

Cache updates involve multiple cache entries 420 at a time. The Cache Manager 430 uses transaction API 340*b* to perform these updates, which ensures that they are performed atomically. If the completed operation 122 is a plain LookUp request 122 (with no pending stripes 320 noted), the cache manager 430 updates the file descriptor header entry 422 and the all stripes entry 424 in the file descriptor cache 410. If there are pending stripes 320 that have been noted along with the completed operation 122, the cache manager 430 creates stripe blocks corresponding to those pending stripes 320 and, in addition to the file descriptor header 422 and all stripes entries 424, those stripe blocks 426 are updated as well. Finally, if the completed operation 122 is a plain LookUpStripes, the cache manager 430 updates the file descriptor header 422 entry and all the stripe block entries 426 (whose descriptors 303 were looked up). In addition, the cache manager 430 removes the all stripes entry 424, since the stripe descriptors 303 in the updated stripe blocks 426 may be newer than their corresponding stripe descriptors 303 in the all stripes entry 424. Such updates to stripe descriptors 303 do not result in changes to the generation field 316 in the file descriptor 301 (used to check consistency of the entries, as described above) so without this removal, the all stripes entry 424 might have stale information in a manner that is not detectable.

In some examples, in a file's steady state, most descriptor changes may occur due to chunk 330 location changes (either due to curator load balancing or memory host 110 draining/crashing). Clients 120 that receive stale descriptors 300 without the new chunk addresses may encounter errors and quickly bring the situation to the attention of the curator 210, which will trigger updates to refresh these entries. The distributed storage system 100 encounters few scenarios where it needs other mechanisms to recover from stale file descriptors 301. In order to provide such a fallback, the cache manager 430 sets a short TTL (Time to Live, which is a mechanism that limits the lifespan or lifetime of data in a computer or network). When the TTL of the event elapses, the cache manager 430 discards the data 312, therefore improving the performance of caching on the entries 420 it inserts into the file descriptor manager 430. This assures that a cache entry 420 is invalidated after the TTL expires, thereby limiting the maximum duration a client 120 is exposed to stale data 312 for a descriptor 300.

In some examples, the cache manager 430 responds to the curator's request 122 with the generation numbers 316 of the descriptors 300 (e.g., file descriptors 301 or stripe descriptors 303). The curator 210 receives the generation numbers 316 and stores the generation numbers 316 (e.g., using non-transitory memory 204 or the file descriptor storage 430). The curator 210 periodically scans the stored generation numbers 316 and compares the numbers to the generation numbers 316 in the file descriptor cache 410. When the system 100 detects an inconsistency between the generation numbers, the system 100 requests that the cache manager 430 update the version in the file descriptor cache 410.

In some implementations, the file descriptor cache 410 includes two configuration files, FileDescriptorCacheConfig and CacheConfig. The FileDescriptorCacheConfig is a part of the distributed storage system 100 cell 200 configuration and stores the paths to the cache descriptor 300 in addition to the stripe block size. The standard CacheConfig encapsulates the parameters that determines the organization of the cache service 350 and includes a number of files 355 (e.g., cache data 312) it can have, a size of the associativity set into which the descriptors 300 are organized, a number of shards into which the cache is divided, whether the service should use a TTL to retire descriptors 300. The file descriptors 300 may include other parameters as well. The parameters are specified as flags (e.g., with appropriate defaults) to the cache manager tasks and are stored in a file 310 (e.g., memory hosts 110) associated with the cache service 350.

Referring to FIGS. 4A and 4B, in some implementations, the client 120 forms cache tags 421 based on a LookUp or LookUpStripes operation 122 and initiates a batch access for looking up the file descriptor header 422 and, depending respectively on whether the operation 122 is LookUp or LookUpStripes, the all stripes entries 424 or stripe block entries 426 (e.g., Steps 1 and 1A using RDMA). If the operation 122 is a LookUp, the client 120 puts together the file descriptor header 422 and all stripes entry 424 (if they have the same generation number 316 and file ID 314) to form a complete file descriptor 301 and returns (see Step 1 and 1B) that file descriptor 301 as a result of the request 122. If the operation 122 is a LookUpStripes, the client 120 extracts the specific stripes 320 that were requested in the call 122 from the returned stripe block entries 426, forms a file descriptor 301 with the file descriptor header 422 and the specific stripe descriptors 303, and returns that file descriptor 301 as the result of the request 122.

In some implementations, the client 120 receives a message that the request 122 was not found in the file descriptor cache 410 (e.g., because the cache data 312 requested is not in the file descriptor storage 400 or due to a mismatch detected in the generation field 316 or identification field 314 of the descriptors 300). The client 120 now sends a LookUp (or LookUpStripes) RPC call 122 to the curator 210 (Step 2). The curator 210 requests the file descriptor header 422 and appropriate stripe descriptors 303 (Step 3, 3A and 3B) and responds to the RPC (Step 4). The curator 210 infers there is a cache miss and initiates a PullFileDescriptor (or PullStripeDescriptor) RPC call on the cache manager 430, requesting it to update the file descriptor cache 410 (Step 5). The cache manager 430 makes a LookUp (or LookUpStripes) call 122 on the curator 210 to request the file descriptor header 422 and stripe descriptors 303 (Step 6). The cache manager 430 may modify the requested stripes 320 to include entire stripe blocks $320_{a-n}$ that together cover the stripes specified in the PullStripeDescriptor request. The curator 210 again looks up the file descriptor 301 and stripe descriptors 303 in the file descriptor storage 400 (Step 7, 7A and 7B) and responds to the cache manager 430 (Step 8). The cache manager 430 forms appropriate cache entries 420 and updates the file descriptor cache 410 (Step 9).

In some implementations, the client 120 encounters an error while accessing a stripe 320 using a file descriptor 301 that the client 120 has previously cached locally (e.g., on client's non-transitory memory). The client 120 looks up the stripe 320 in the file descriptor cache 410 using a NotifyError operation, which implicitly encapsulates a LookUpStripes operation. If the stripe descriptor 303 is found in the file descriptor cache 410 and stripe descriptor 303 does not match the local stripe descriptor 303 that the client 120 already had, then the client 120 uses the stripe descriptor 303 from the file descriptor cache 410 to access the stripe 320. If the stripe descriptor 303 found in the file descriptor cache 410 matches the local file descriptor 303 that the client 120 already has, the client 120 initiates a NotifyError operation on the curator 210. The curator 210 looks up the file descriptor 301 in the file descriptor storage 400, and returns the appropriate stripe descriptor 303 to the client 120. The curator 210 also infers that the information for the stripe 320 (i.e., the stripe descriptor 303) in the file descriptor cache 410 is either non-existent or stale, and initiates a PullStripeDescriptor operation on the cache manager 430, which ultimately updated the file descriptor cache 410.

Figure 5:
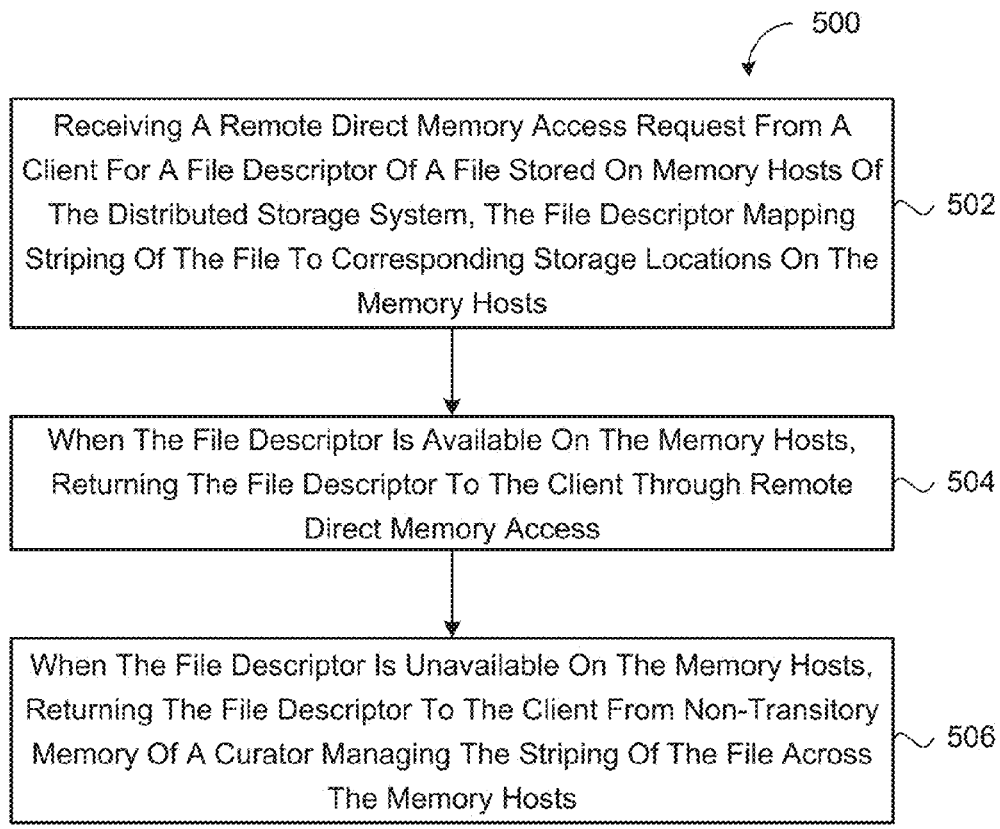
FIG. 5 provides a schematic view of an exemplary arrangement of operations for a method of managing data in a distributed storage system.

FIG. 5 provides an exemplary arrangement of operations for a method 500 of managing data 312 in a distributed storage system 100, with additional reference to FIGS. 4A and 4B. The method 500 includes receiving 502 a remote direct memory access request 122 from a client 120 for a descriptor 300 of a file 310 or one or more stripes 320 of the file 310 stored on memory hosts 110 of the distributed storage system 100. The descriptor 300 maps striping of the file 310 to corresponding storage locations on the memory hosts 110. When the descriptor 300 is available on the memory hosts 110, the method 500 includes returning 504 the descriptor 300 (e.g., data 312, which includes file descriptor 301, and/or stripe descriptor 303) to the client 120 through remote direct memory access (RDMA). When the descriptor 300 is unavailable on the memory hosts 110, the method 500 includes returning 506 the descriptor 300 to the client 120 from non-transitory memory (e.g., memory 204 or file descriptor storage 400) of a curator 210 managing the striping of the file 310 across the memory hosts 110.

In some examples, when the descriptor 300 is unavailable on the memory hosts 110, the method 500 includes storing a copy of the descriptor 300 in remote direct memory accessible non-transitory memory 114 of the memory hosts 110. The method 500 may include servicing the remote direct memory access request 122 through a network interface controller 116 in communication with non-transitory memory of a memory host 110. Additionally or alternatively, the method 500 may include storing the copy of the descriptor 300 in a file descriptor cache 410 having an address space on the memory hosts 110 known by the client 120. The descriptor 300 may be stored in a circular data file 355 having a fixed size, a first-in-first-out queue having a front 382 and a back 384, and a tail pointer 390 providing an offset 392 to the front of the queue.

In some implementations, the method 500 further includes receiving the file 310, dividing the file 310 into stripes 320, replicating the stripe 320 into a stripe replica $330n_{1-k}$ or dividing the stripe 320 into chunks 330 (e.g., data chunks and chunks), and generating the descriptor 300 for the file 310. The descriptor 300 maps any stripe replicas $330n_{1-k}$ and any chunks (data chunks $330nd_{1-k}$ and code chunks $330nc_{1-k}$) to corresponding storage locations on memory hosts 110. The method 500 may include storing the descriptor 300 in non-transitory memory (e.g., memory 204 or file descriptor storage 400) of the curator 210 and storing a copy of file descriptor 300 in remote direct memory accessible non-transitory memory 114 of the memory hosts 110.

In response to receiving a memory access request 122 for a file 310 having a descriptor 300 unavailable on the memory hosts 110, the method 500 may include returning a descriptor 300 associated with the file 310 for remote direct memory access of the file 310 on the memory hosts 110. In some examples, the method 500 includes receiving the memory access request 122 as a remote procedure call. The descriptor 300 may include a key 302 allowing access to the memory hosts 114. The descriptor 300 may also include address information for the entire file 310 (e.g., file descriptor headers 422), a stripe 320 of the file 310 (e.g., stripes entries 424), or a block of stripes $320_{a-n}$ within the file 310 (e.g., stripe block entries 426).

Figure 6:
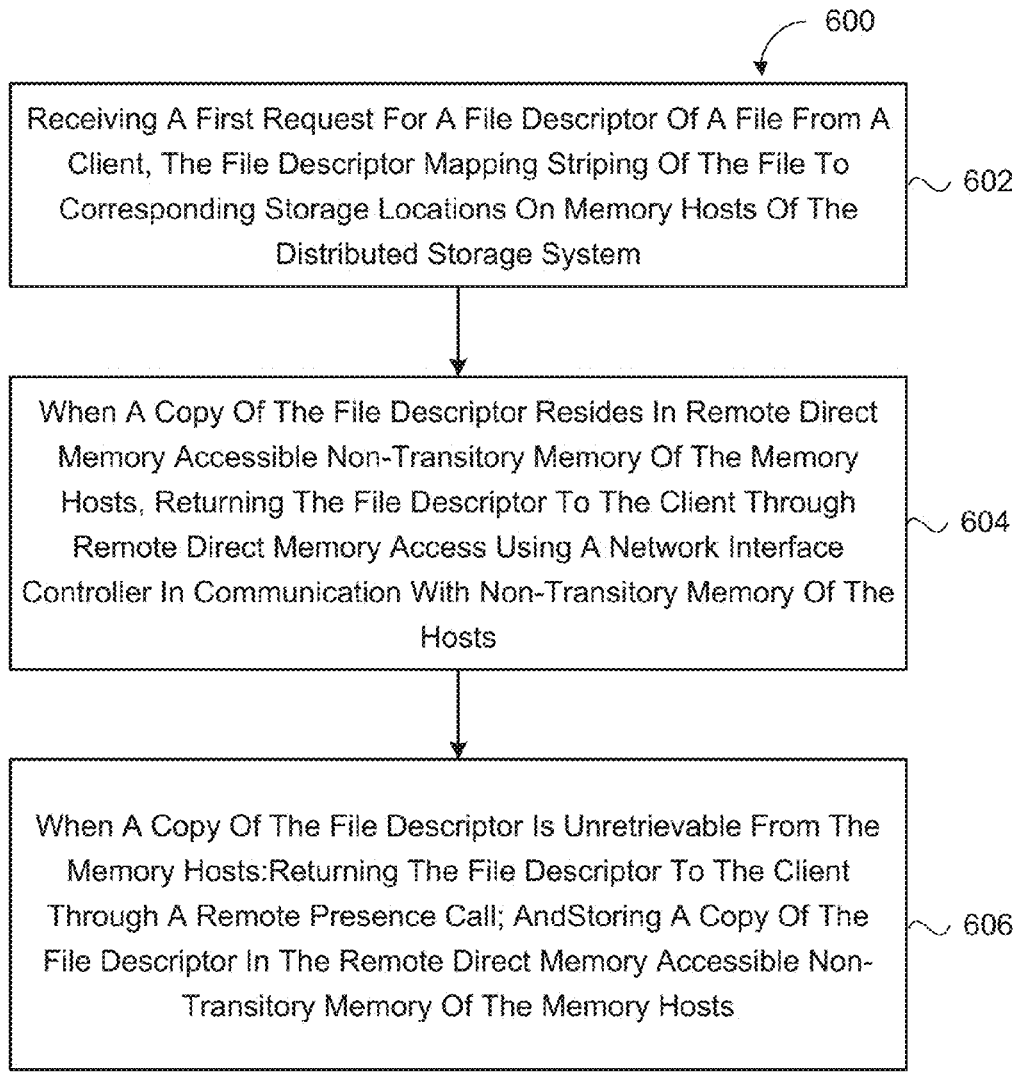
FIG. 6 provides a schematic view of an exemplary arrangement of operations for a method of managing data in a distributed storage system.

FIG. 6 provides an exemplary arrangement of operation for a method 600 of managing data in a distributed storage system 100, with additional reference to FIGS. 4A and 4B. The method 600 includes receiving 602 a first request 122 for a descriptor 300 of a file 310 from a client 120. The descriptor 300 maps striping of the file 310 to corresponding storage locations 114 on memory hosts 110 of the distributed storage system 100. When a copy of the descriptor 300 resides in remote direct memory accessible non-transitory memory 114 of the memory hosts 110, the method 600 includes returning 604 the descriptor 300 to the client 120 through remote direct memory access using a network interface controller 116 in communication with non-transitory memory 114 of the memory hosts 110. When a copy of the descriptor 300 is unretrievable from the memory hosts 110, the method 600 includes returning 606 the descriptor 300 to the client 120 through a remote procedure call and storing a copy of the descriptor 300 in the remote direct memory accessible non-transitory memory 114 of the memory hosts 110.

In some examples, when a copy of the descriptor 300 is unretrievable from the memory hosts 110, the method 600 includes retrieving the descriptor 300 from non-transitory memory (e.g., memory 204 or file descriptor storage 400) of a curator 210 managing the striping of the file 310 (i.e., stripe replicas $330n_{1-k}$ and any chunks (data chunks $330nd_{1-k}$ and code chunks $330nc_{1-k}$)) across the memory hosts 110, before returning the descriptor 300 to the client 120. The method 600 may include storing the copy of the descriptor 300 in a file descriptor cache 410 having an address space in the remote direct memory accessible non-transitory memory 114 of the memory hosts 110 known by the client 120.

In some implementations, the method 600 includes receiving the file 310, dividing the file 310 into stripes 320, replicating the stripe 320 into stripe replicas $330n_{1-k}$ or dividing the stripe into chunks (data chunks $330nd_{1-k}$ and code chunks $330nc_{1-k}$) and generating the descriptor 300 (e.g., file descriptor 301 and stripe descriptor 303) for the file 310. The descriptor 300 maps any stripe replicas $330n_{1-k}$ and any data chunks $330nd_{1-k}$ and code chunks $330nc_{1-k}$ to corresponding storage locations 114 on memory hosts 110. The method 600 also includes storing the descriptor 300 in non-transitory memory (e.g., memory 204 or file descriptor storage 400) of the curator 210 and storing a copy of the descriptor 300 in the file descriptor cache 410. The descriptor 300 may include a key 302 allowing access to the memory hosts 110 and address information for the entire file 310 (e.g., file descriptor headers 422), a stripe 320 of the file 310 (e.g., stripes entries 424), or a block of stripes $320_{a-n}$ within the file 310 (e.g., stripe block entries 426).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A distributed storage system comprising:
    memory hosts, each memory host comprising:
        remote direct memory accessible non-transitory memory; and
        a network interface controller in communication with the memory and servicing remote direct memory access requests;
    a curator in communication with the memory hosts, the curator:
        managing striping of a file amongst the memory hosts; and
        generating a file descriptor for the file that maps the striping of the file to corresponding storage locations on memory hosts; and
    a cache manager in communication with and separate from both the curator and the memory hosts, the cache manager obtaining a copy of the file descriptor from the curator and transmitting the copy of the file descriptor to the remote direct memory accessible non-transitory memory of the memory hosts, the remote direct memory accessible non-transitory memory of the memory hosts storing the copy of the file descriptor for remote direct memory access of the file descriptor by a client in communication with the memory hosts,
    wherein in response to a memory access request for the file by the client and when the copy of the file descriptor is unretrievable from the memory hosts by the client, the curator provides the client with the file descriptor associated with the file and informs the cache manager of the unretrievable file descriptor, and
    wherein in response to being informed of the unretrievable file descriptor, the cache manager obtains a new copy of the file descriptor from the curator and transmits the new copy of the file descriptor to the remote direct memory accessible non-transitory memory of the memory hosts, the remote direct memory accessible non-transitory memory of the memory hosts storing the new copy of the file descriptor for remote direct memory access of the file descriptor by the client, the client obtaining the file from the remote direct memory accessible non-transitory memory by using the file descriptor.

2. The distributed storage system of claim 1, wherein the curator:

divides the file into stripes; and for each stripe, replicating the stripe or dividing the stripe into data chunks;

wherein the file descriptor maps any stripe replicas and any data chunks to corresponding storage locations on memory hosts.

3. The distributed storage system of claim 1, wherein the curator comprises non-transitory memory storing the file descriptors.

4. The distributed storage system of claim 1, wherein the curator sends the file descriptor to the client through a remote procedure call.

5. The distributed storage system of claim 1, wherein the cache manager stores the copy of the file descriptor retrieved from the curator in a file descriptor cache having an address space on the memory hosts known by the client.

6. The distributed storage system of claim 5, wherein the cache manager stores the file descriptor in the file descriptor cache in a circular data file having a fixed size, a first-in-first-out queue having a front and a back, and a tail pointer providing an offset to the front of the queue.

7. The distributed storage system of claim 1, wherein the file descriptor comprises a key allowing access to the memory hosts.

8. The distributed storage system of claim 1, wherein the file descriptor comprises address information for the entire file, a stripe of the file, or a block of stripes within the file.

9. A method of managing data in a distributed storage system, the method comprising:

receiving a remote direct memory access request from a client for a file descriptor of a file stored on memory hosts of the distributed storage system, the file descriptor mapping striping of the file to corresponding storage locations on the memory hosts;

determining whether the file descriptor is available on the memory hosts;

when the file descriptor is available on the memory hosts, returning the file descriptor to the client through remote direct memory access using a network interface controller in communication with remote direct memory accessible non-transitory memory of the memory hosts; and when the file descriptor is unavailable on the memory hosts:

obtaining a copy of the file descriptor from non-transitory memory of a curator managing the striping of the file across the memory hosts;

transmitting the copy of the file descriptor to the client; and transmitting the copy of the file descriptor to the remote direct memory accessible non-transitory memory of the memory hosts, the remote direct memory accessible non-transitory memory of the memory hosts storing the copy of the file descriptor for remote direct memory access of the file descriptor by the client, the client obtaining the file from the remote direct memory accessible non-transitory memory by using the file descriptor.

10. The method of claim 9, further comprising storing the copy of the file descriptor in a file descriptor cache having an address space on the memory hosts known by the client, the file descriptor stored in a circular data file having a fixed size, a first-in-first-out queue having a front and a back, and a tail pointer providing an offset to the front of the queue.

11. The method of claim 9, further comprising:
receiving the file;
dividing the file into stripes;

for each stripe, replicating the stripe or dividing the stripe into data chunks; and generating the file descriptor for the file, the file descriptor mapping any stripe replicas and any data chunks to corresponding storage locations on memory hosts.

12. The method of claim 11, further comprising:

storing the file descriptor in the non-transitory memory of the curator;

creating the copy of the file descriptor; and storing the copy of the file descriptor in the remote direct memory accessible non-transitory memory of the memory hosts.

13. The method of claim 9, further comprising, in response to receiving the remote direct memory access request for the file having the file descriptor unavailable on the memory hosts, returning the copy of the file descriptor associated with the file through a remote procedure call.

14. The method of claim 9, wherein the file descriptor comprises a key allowing access to the memory hosts.

15. The method of claim 9, wherein the file descriptor comprises address information for the entire file, a stripe of the file, or a block of stripes within the file.

16. A method of managing data in a distributed storage system, the method comprising:

receiving a request for a file descriptor of a file from a client, the file descriptor mapping striping of the file to corresponding storage locations on memory hosts of the distributed storage system, the file descriptor stored in non-transitory memory of a curator managing the striping of the file across the memory hosts;

determining whether a copy of the file descriptor is available on remote direct memory accessible non-transitory memory of the memory hosts;

when the copy of the file descriptor is available on the remote direct memory accessible non-transitory memory of the memory hosts, returning the copy of the file descriptor to the client through remote direct memory access using a network interface controller in communication with the remote direct memory accessible non-transitory memory of the memory hosts; and when the copy of the file descriptor is unavailable on the remote direct memory accessible non-transitory memory of the memory hosts:

returning the file descriptor to the client from the non-transitory memory of the curator through a remote procedure call;

generating a new copy of the file descriptor using the file descriptor stored in the non-transitory memory of the curator; and transmitting the new copy of the file descriptor to the remote direct memory accessible non-transitory memory of the memory hosts, the remote direct memory accessible non-transitory memory of the memory hosts storing the new copy of the file descriptor for remote direct memory access of the file descriptor by the client, the client obtaining the file from the remote direct memory accessible non-transitory memory by using the file descriptor.

17. The method of claim 16, further comprising, when the copy of the file descriptor is unavailable on the remote direct memory accessible non-transitory memory of the memory hosts, retrieving the file descriptor from the non-transitory memory of the curator before returning the file descriptor to the client.

18. The method of claim 17, further comprising storing the copy of the file descriptor in a file descriptor cache having an address space in the remote direct memory accessible non-transitory memory of the memory hosts known by the client.

19. The method of claim 17, further comprising:
- receiving the file;
- dividing the file into stripes;
- for each stripe, replicating the stripe or dividing the stripe into data chunks; and
- generating the file descriptor for the file, the file descriptor mapping any stripe replicas and any data chunks to corresponding storage locations on memory hosts;
- storing the file descriptor in the non-transitory memory of the curator;
- generating the copy of the file descriptor; and
- storing the copy of the file descriptor in the file descriptor cache.

20. The method of claim 16, wherein the file descriptor comprises a key allowing access to the memory hosts and address information for the entire file, a stripe of the file, or a block of stripes within the file.

* * * * *